US012085312B2

(12) United States Patent
Kirscht

(10) Patent No.: US 12,085,312 B2
(45) Date of Patent: Sep. 10, 2024

(54) SENSOR ARRANGEMENT AND OPTIMIZED TRACKING FOR CSP SYSTEMS

(71) Applicant: Cambras GmbH, Gruenwald (DE)

(72) Inventor: Lukas Kirscht, Rees-Haldern (DE)

(73) Assignee: Cambras GmbH, Gruenwald (DE)

( * ) Notice: Subject to any disclaimer, the term of this patent is extended or adjusted under 35 U.S.C. 154(b) by 480 days.

(21) Appl. No.: 17/373,433

(22) Filed: Jul. 12, 2021

(65) Prior Publication Data
US 2021/0341180 A1 Nov. 4, 2021

Related U.S. Application Data

(63) Continuation of application No. PCT/EP2020/050551, filed on Jan. 10, 2020.

(30) Foreign Application Priority Data

Jan. 11, 2019 (EP) .................................... 19151496
Jun. 7, 2019 (EP) .................................... 19179193

(51) Int. Cl.
F24S 50/20 (2018.01)
F24S 23/74 (2018.01)
F24S 50/40 (2018.01)
F24S 50/80 (2018.01)

(52) U.S. Cl.
CPC ............... *F24S 50/20* (2018.05); *F24S 23/74* (2018.05); *F24S 50/40* (2018.05); *F24S 50/80* (2018.05)

(58) Field of Classification Search
CPC .. F24S 50/20; F24S 50/80; F24S 50/40; F24S 23/74

USPC ......................................................... 126/573
See application file for complete search history.

(56) References Cited

U.S. PATENT DOCUMENTS

| | | | |
|---|---|---|---|
| 4,274,394 A | 6/1981 | Stromberg | |
| 4,297,572 A | 10/1981 | Carlton | |
| 4,306,540 A | 12/1981 | Hutchison | |
| 4,445,030 A * | 4/1984 | Carlton | G01S 3/7861 126/578 |
| 4,559,926 A | 12/1985 | Butler | |
| 8,405,013 B2 * | 3/2013 | Chen | F24S 50/20 250/203.1 |
| 8,993,949 B2 | 3/2015 | Madore et al. | |
| 2009/0205637 A1 * | 8/2009 | Moore | F24S 50/60 126/576 |
| 2010/0310116 A1 * | 12/2010 | Sasakawa | G01W 1/12 382/100 |
| 2011/0061643 A1 | 3/2011 | Bohl | |
| 2013/0092155 A1 | 4/2013 | McCord et al. | |
| 2013/0213455 A1 * | 8/2013 | Matalon | F24S 40/52 126/634 |
| 2017/0104449 A1 * | 4/2017 | Drees | G01W 1/10 |
| 2017/0363330 A1 | 12/2017 | Kirscht | |

* cited by examiner

*Primary Examiner* — Avinash A Savani

(74) *Attorney, Agent, or Firm* — Muncy, Geissler, Olds & Lowe, P.C.

(57) ABSTRACT

Sensor arrangement for tracking a solar collector assembly, the sensor arrangement comprising a housing; said housing comprising an inclination sensor and a camera; said sensor arrangement comprising a shadow receiver; said shadow receiver being arranged and adapted to receive the full shadow of a solar system's receiver tube; wherein the camera and the shadow receiver are arranged such that the camera may sense the full width of the receiver tube's shadow on the shadow receiver.

22 Claims, 22 Drawing Sheets

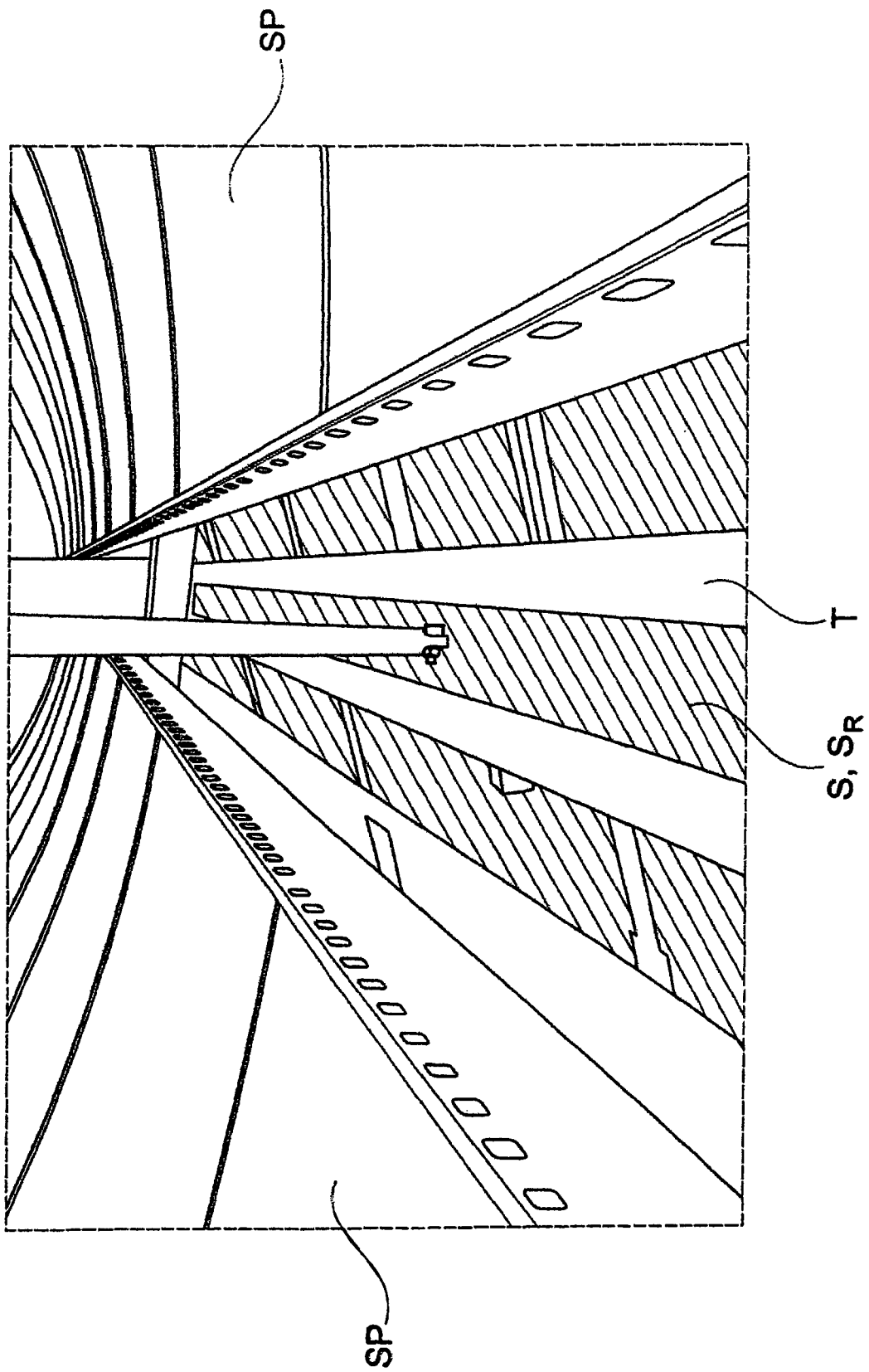

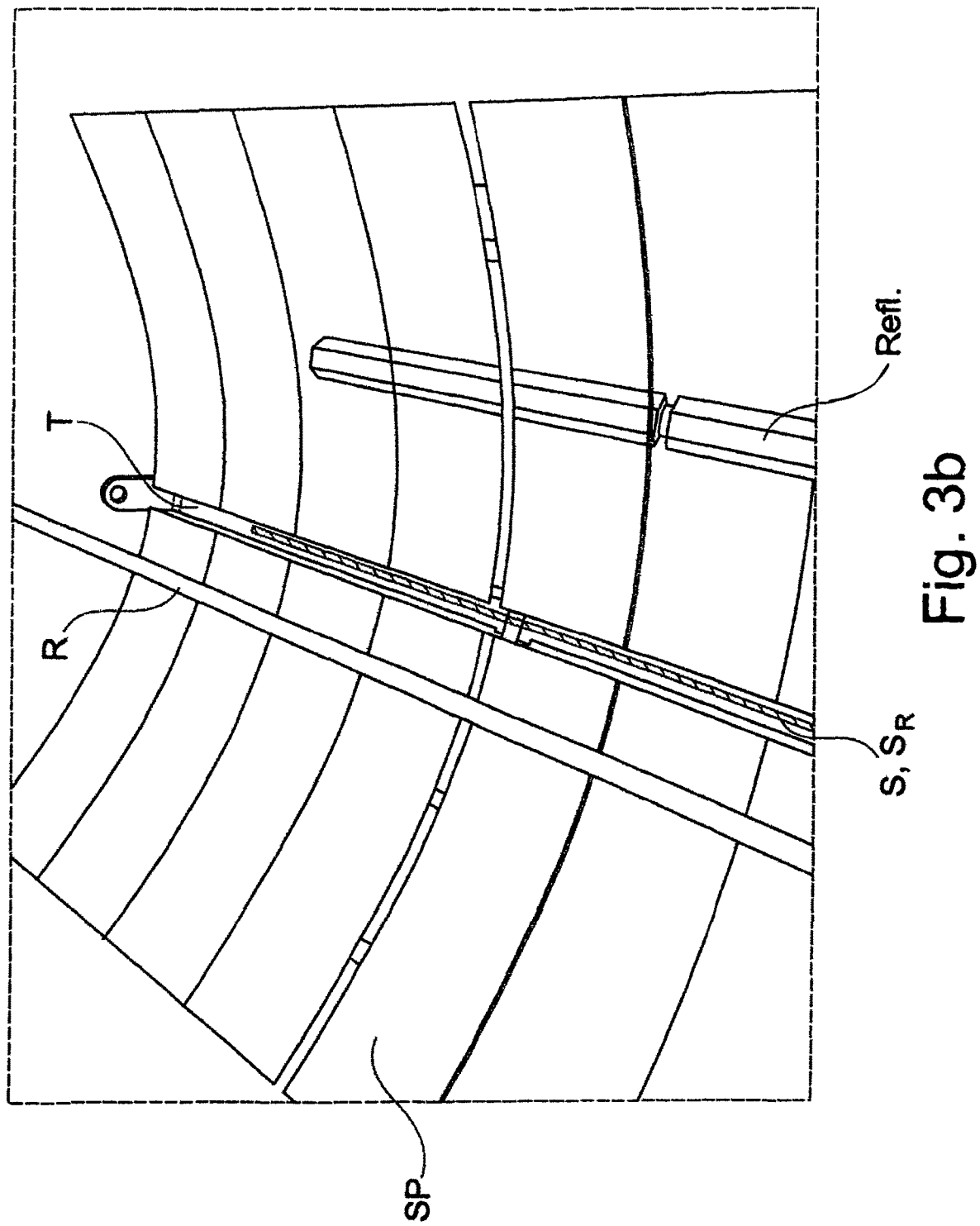

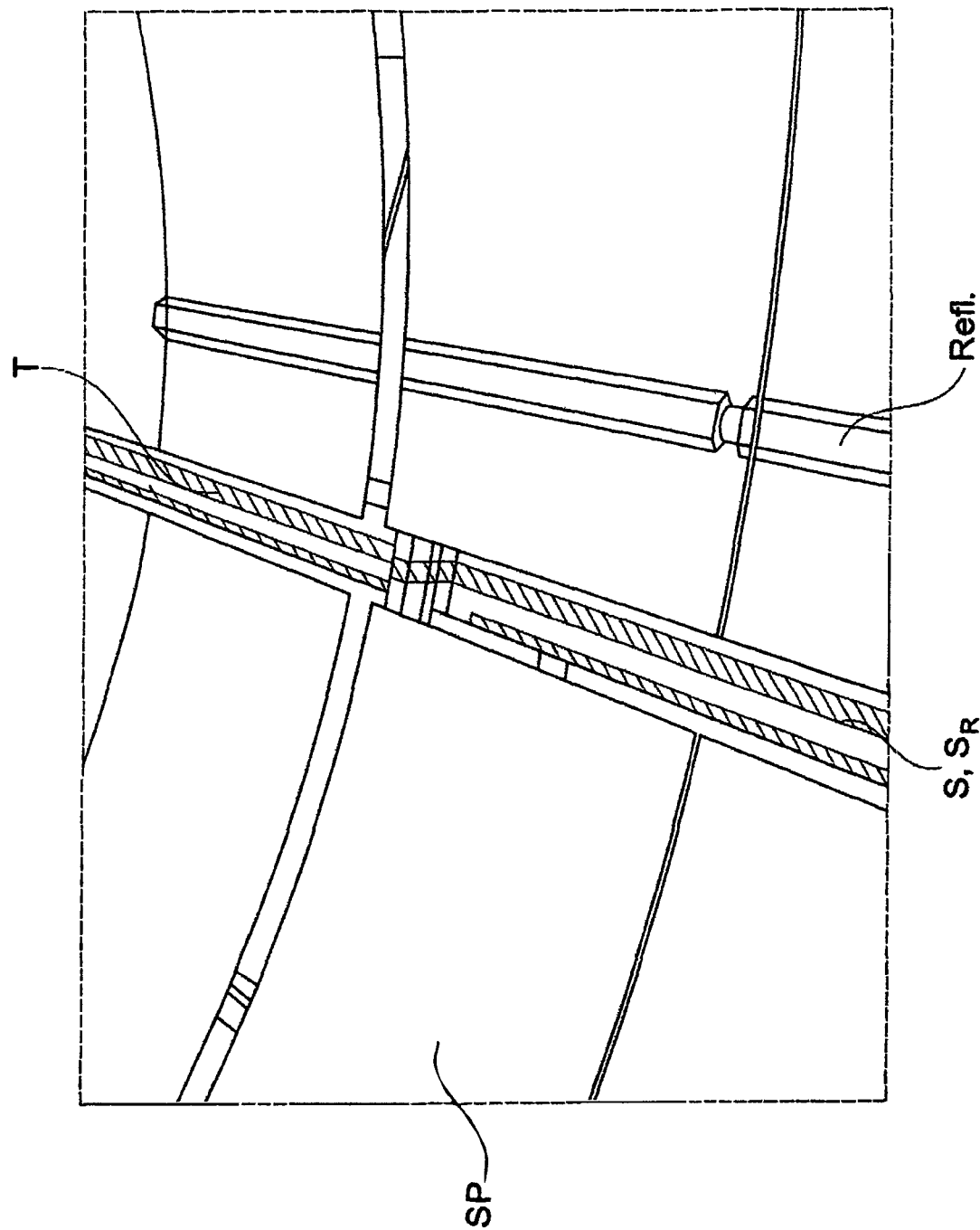

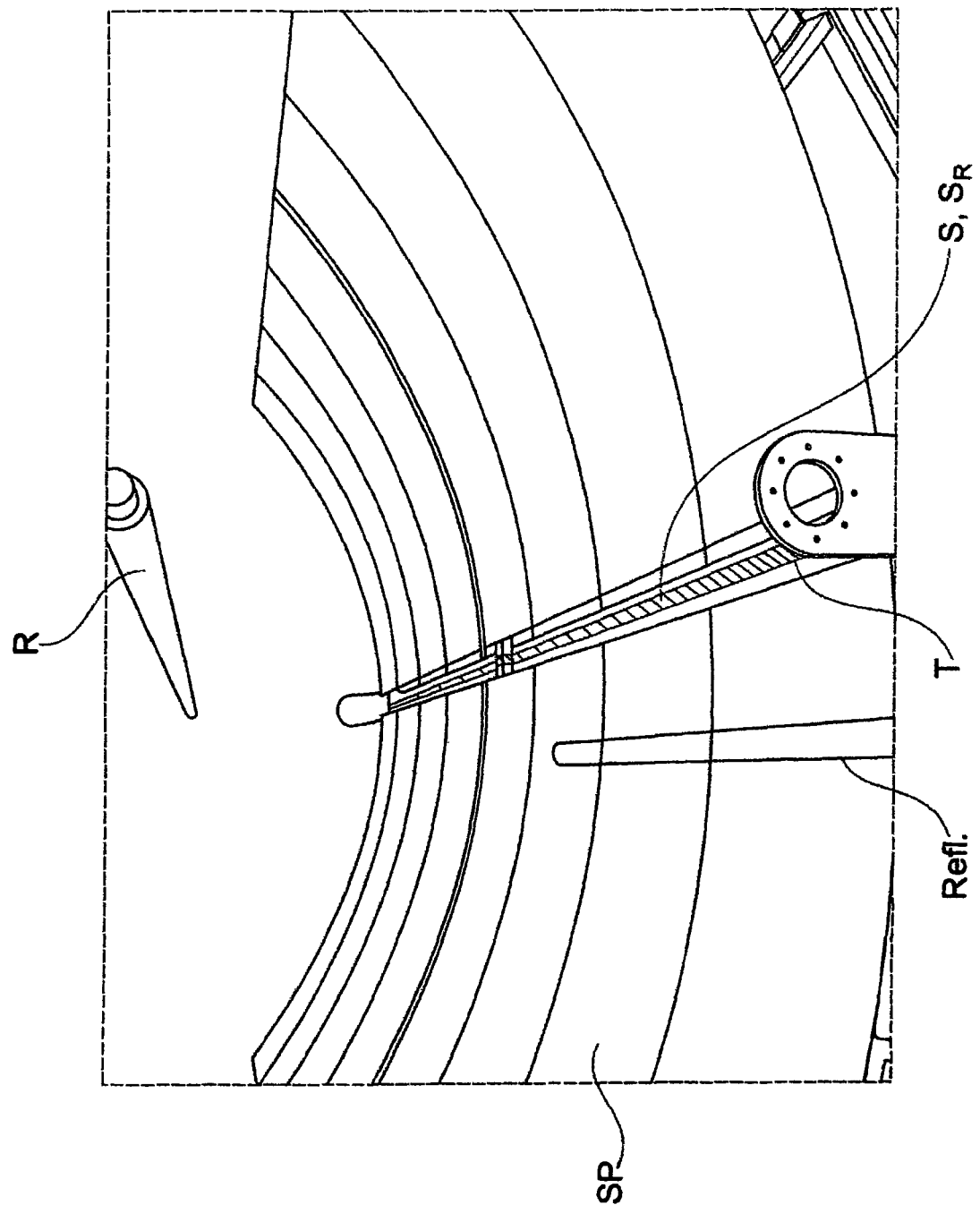

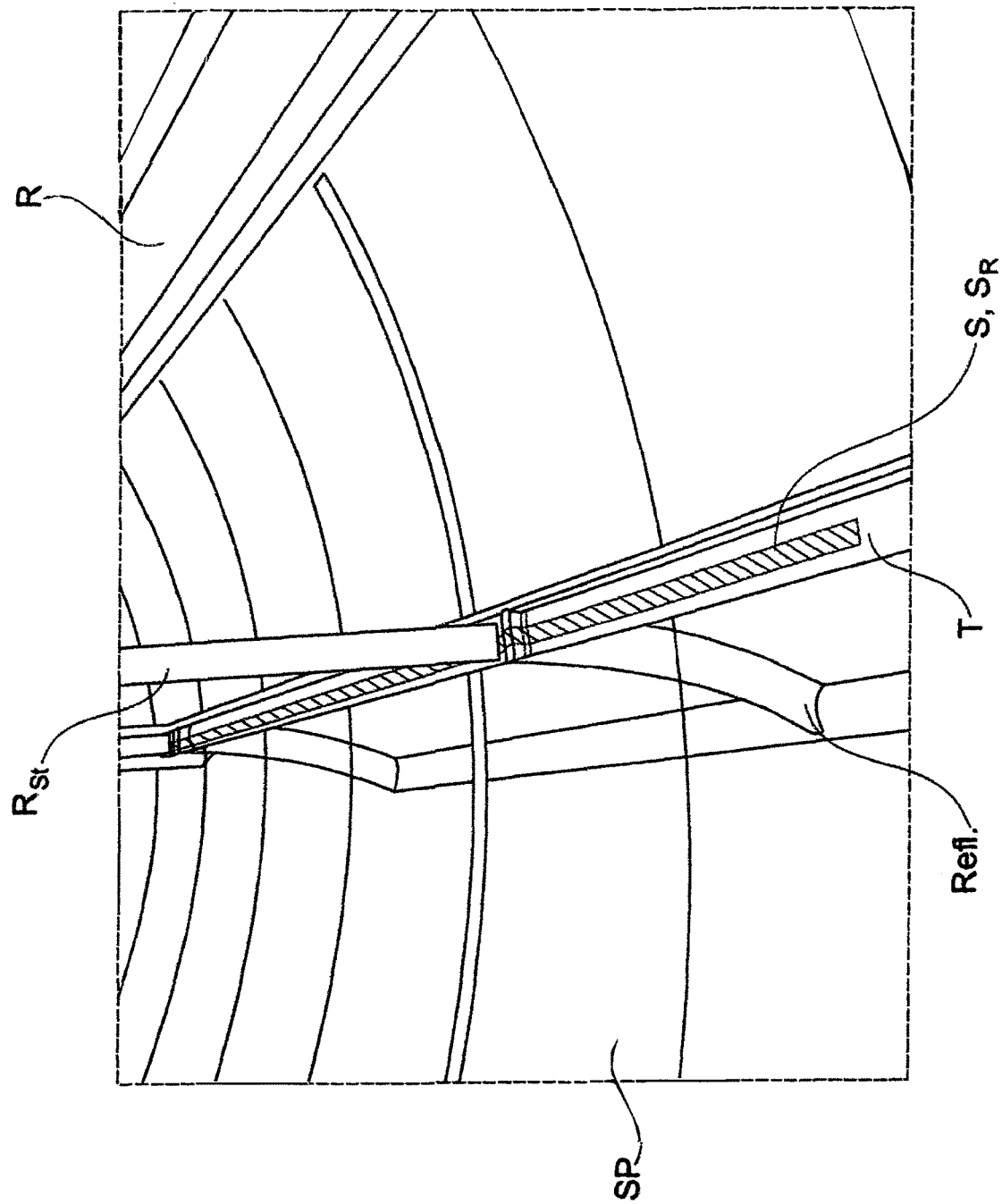

Cross Section A-A
Scale 1:1

Cross Section B-B
Scale 1:1

Cross Section A-A

Cross Section A-A

Cross Section B-B

SENSOR ARRANGEMENT AND OPTIMIZED TRACKING FOR CSP SYSTEMS

This nonprovisional application is a continuation of International Patent Application No. PCT/EP2020/050551, filed on Jan. 10, 2020, and claims priority under 35 U.S.C. § 119(a) to European Patent Application No. 19151496.7, which was filed on Jan. 11, 2019 and European Patent Application No. 19179193.8, which was on Jun. 7, 2019, and which are all herein incorporated by reference.

BACKGROUND OF THE INVENTION

Field of the Invention

The present invention relates to a system and a method for tracking the sun with systems concentrating solar power. The expression Concentrated Solar Power ("CSP") is commonly used as a generic term for this technology. In such systems and methods, usually the direct solar radiation is focused onto a receiver or solar absorber via reflectors. Since the position of the sun changes over time, the alignment of components of the system has to be accordingly adapted, i.e. the sun has to be tracked with the system.

Description of the Background Art

CSP systems focus the direct solar radiation by using focusing reflector areas that focus the incident sunlight onto an absorber. The reflector and the absorber are fixed in position to one another and together track the sun. The systems collect solar energy in this way via a large area of the reflector and concentrate it onto a comparably small area of the receiver. The reflector or collector concentrates, for example, radiation incident on an area of 60 m$^2$ onto a receiver area of 1 m$^2$. It is thus possible to achieve low losses and high temperatures via the ratio of large collector area to small receiver area.

In so-called solar farm power plants, the heat is collected in many absorbers or receivers distributed over a large area, whereas, for example, in solar tower power plants or parabolic power plants, the solar radiation is focused via point concentrators onto a focal spot. All of these systems differ in many features from direct solar systems or solar electricity plants, such as, for example, photovoltaic plants, as well as from solar thermal plants without focusing, such as, for example, thermal power plants.

The CSP systems within the meaning of the present invention in particular and preferably include systems comprising one or many parabolic trough collectors or Fresnel collectors connected in parallel, so-called linear concentrators. In the collector array, for example, a heat transfer medium is heated, such as, e.g., heat transfer oil or superheated steam. The heated heat transfer medium is subsequently supplied to, for example, a turbine and a generator for the generation of electric energy.

The system of a parabolic trough power plant is exemplarily shown in FIG. 1. A parabolic trough comprises a linear parabolic reflector SP that concentrates light onto a receiver positioned along the reflector's focal line. The receiver usually is a tube positioned directly above the middle of the parabolic mirror and filled with a working fluid. The reflector follows the sun during the daylight hours by tracking along a single axis. A working fluid (e.g. molten salt or oil) is heated to 150-400° C. (oil) or 200-550° C. (molten salt) as it flows through the receiver. The hot fluid can be used for many purposes. Often, it is piped to a heat engine, which uses the heat energy to drive machinery or to generate electricity, or it is piped to a thermal energy storage (TES).

A parabolic trough is a type of solar thermal collector that is straight in one dimension and curved as a parabola in the other two, for example lined with a polished metal mirror. The sunlight which enters the mirror parallel to its plane of symmetry is focused along the focal line and thus concentrated on the receiver tube, which runs along the length of the trough at its focal line and which contains the fluid intended to be heated.

The parabolic trough is usually aligned on a north-south axis, and rotated to track the sun as it moves across the sky each day. Parabolic trough concentrators have a simple geometry, but their concentration is about ⅓ of the theoretical maximum for the same acceptance angle, that is, for the same overall tolerances of the system to all kinds of errors. Still, existing systems suffer from suboptimal tracking due to tolerances, e.g., with in the overall construction of the parabolic trough as well as within the power train of the tracking system as well as due to suboptimal tracking algorithms and/or tracking sensor arrangements.

A parabolic trough is made of a number of solar collector modules (SCM) also referred to as solar collector elements (SCE) fixed together to move as one solar collector assembly (SCA) SP. An SCM could have a length up to 16 meters or more. About a dozen or more of SCM make each SCA up to e.g., 160 or even 200 meters length. Each SCA is an independently-tracking parabolic trough.

An SCM may be made as a single-piece parabolic mirror or assembled with a number of smaller mirrors in parallel rows. In addition, V-type parabolic troughs exist which are made from 2 mirrors and placed at an angle towards each other.

As shown, the parabolic trough collectors SP focus the sunlight So onto an absorber tube or a so-called receiver R extending in the focal line (cf. right illustration). In the absorber tubes, the concentrated solar radiation is converted into heat and dissipated to a circulating heat transfer medium. The heat medium is than passed through pipes (solar field piping) for further use or energy generation (conversion), as referred to above. For reasons of cost, the parabolic troughs usually track the sun only uniaxially. Therefore, they are arranged in the north-south direction and track the sun or are tilted only according to the solar altitude during the course of a day. This is schematically illustrated in FIG. 2. This system, as well as the other SPs or SCMs etc. further described herein, may advantageously be used together with or as part of the present invention.

Parabolic troughs or parabolic trough mirrors have a cross-section that is essentially parabolically configured, preferably in the cross-section perpendicular to the trough axis. Such a shape of the mirror has the property that all rays incident parallel to its axis of symmetry are reflected through the focal spot of the parabola (cf. right illustration in FIG. 1). This geometric principle is applied, i.a., for parabolic (trough) mirrors using a parabolic area comprising reflecting surfaces (mirrors) in order to concentrate incident sunlight in a focal spot or in the case of a parabolic trough mirror on a focal line. The energy of the focused sunlight is absorbed by so-called receivers mounted along the focal spot or the focal line and, converted for example into heat, used for further energy conversion. Known parabolic trough mirrors essentially comprise a trough-like or curved mirror (or a plurality of mirrors forming together a trough) referred to as reflector, an absorber tube referred to as receiver and a supporting structure or base.

The solar collector modules (SCM) of a solar collector assembly (SCA), also referred to as a parabolic trough, SP often only form half of the parabolic trough when seen in cross section of the longitudinal axis of the parabolic trough and may leave a gap at the deepest point of the trough. In this case, preferably a beam, for example a so-called torsion tube, may extend along the longitudinal axis of the trough at this point (of the cross-section). This can be deduced, for example, from the illustrations according to FIGS. 3a, 3b, 3c, 3d, and 3e. This beam is tightly connected with and may form part of the supporting structure or guide matrix of the SCA. Preferably, it extends parallel to a pivot axis, which in turn preferably extends along the deepest point of the trough and along which the trough can be pivoted in order to achieve an optimum orientation towards the sun. Alternative embodiments of the general design are known. For example, there may not be a beam or torsion tube as referred to above but merely a gap at the deepest point of the trough between the SCM's forming an SCA. Also, there may not even be a gap but the parabolic trough may be closed at its deepest point. The discussion of the present invention herein includes the previously described designs but is not limited thereto.

Precise alignment and focusing of the solar radiation are necessary due to the concentration of the solar radiation onto a comparatively small receiver area. A further criterion is the alteration in the position of the sun and thus in the angle of incidence of the solar radiation as a function of time and solar altitude. Therefore, a tracking arrangement is required for following the sun with systems concentrating solar power. In this connection, the calculated position of the sun is usually used as actual value. However, this entails problems in practice.

In particular, the actual solar radiation can deviate from the solar radiation expected as a result of the calculated position of the sun. This deviation is not astronomically caused but, for example, is due to light refractions of the solar radiation at air layers having considerably differing temperatures. Furthermore, deviations from the pre-calculated or calculable radiation paths occur due to constructional inaccuracy during building the system, constructional inaccuracy developing in the course of operation, e.g., base movements, as well as constructional inaccuracy caused by the wear of drives, as well as inaccuracy resulting from sensory difficulties when recording the actual position.

Consequently, the components of the system have to fulfill a number of requirements. For example, the substructure holding the reflector and/or receiver is of importance as regards the exact positioning of reflector and/or receiver. Therefore, high demands on dimensional accuracy, weather resistance, wind load, grounding, and weight have to be met. The tracking system or tracking, whether discontinuous or continuous, must also fulfill requirements with respect to starting accuracy, holding accuracy, energy consumption, safeguarding against failure and policy compliance. The system components, in particular of the substructure and tracking arrangement, are of particular importance as regards the aforementioned constructional inaccuracies in tracking.

In order to attenuate or eliminate the aforementioned and further problems with tracking, systems are used that determine the actual position of the sun and the actual solar radiation deviating from the expected solar radiation. In this connection, the angle of incidence of the solar radiation onto the reflector is of particular importance.

To this end, it is known, on the one hand, to use systems which are completely independent and not connected to the structure to be respectively aligned and which determine the actual position of the sun. These systems include, for example, a sundial. However, this usually does not overcome at least the aforementioned problems resulting from constructional inaccuracy, from wear or ageing.

Alternatively, it is known to combine the position measurement with the system design and to perform a relative position measurement of the sun with respect to the concentrating system. As regards this measurement, ways are known to measure the radiation directly at the receiver. However, this turned out to be a non-viable option as well. In particular, the radiation intensity/density at the receiver is very high so that the requirements which the sensors as well as the components have to fulfill are beyond the available scope—as regards both economic criteria and the general fulfillment of the technical requirements. As far as available, the lifetime of the components is extremely short.

It is also known to resort to the observation of a shadow via specific sensors which analyze the cast shadow. In this connection, the shadow cast by a blind is analyzed via a sensor comprising two photovoltaic (PV) cells. When the shadow extends symmetrically on the centre line of the PV cell array, the tensions of the two cells have the same value. When the shadow migrates out of the centre due to movement of the collector or the sun, the tension of the cell that is shaded more than the other reduces.

Such a system usually has a PV cell sensor connected via wiring to a signal amplifier which in turn is connected to a separate control unit in the solar field for signal processing, said control unit being accommodated in a separate housing. The control runs a program for analyzing the signal values and transmits the results via wiring via an interface to the control room. Control signals are then sent to the plant for accordingly adapting the alignment of the system.

However, such systems have proven to be disadvantageous in several respects. On the one hand, they are complex and their installation and maintenance is cost-intensive and service-intensive. For example, they have to be cleaned about twice a day or more often. On the other hand, the resolution and accuracy of the systems is not sufficient. Furthermore, the lifetime of the system is limited and high costs arise due to construction-related maintenance work and repairs as well as due to software-related maintenance. Finally, the installation of the entire system is intricate and involves comprehensive interference with the existing system architecture.

WO 2016/107882, which corresponds to U.S. Pat. No. 10,697,669, which discloses a CSP system comprising a reflector, i.e. a parabolic trough mirror, with a receiver tube for concentrating the solar radiation incident on the reflector onto the receiver, comprising a shadow blind and a shadow receiver as well as a camera arranged to detect the shadow of the shadow blind on the shadow receiver in order to determine a deviation of the actual shadow position from a target shadow position, a tracker configured to adapt the position of the reflector and the receiver according to the deviation. The reflector and the receiver are connected to and held by a supporting substructure. The shadow blind is the receiver itself and the reflector is the shadow receiver. Moreover, a T-beam and preferably the torsion tube of the substructure functions as the shadow receiver. The CSP system, the sensor arrangement and the corresponding tracking method of WO 2016/107882 are incorporated herein in its entirety.

While this system is improved over other technologies known from the prior art it still suffers from some disadvantages. For example, accuracy of the tracking can only be as good as the accuracy of the sensor's mounting position. This put a high demand on mounting accuracy as well as bears the risk of deterioration over time, e.g. due to drift, e.g. based on temperature or age, of the construction and/or the sensor.

SUMMARY OF THE INVENTION

It is therefore an object of the present invention to provide an improved CSP system. The system should preferably overcome the disadvantages of the prior art. In particular, it is intended to be simple to build and handle, economical, long-lasting and accurate. Moreover or alternatively, it is intended to allow improved accuracy in tracking and to allow improved operation of a solar field comprising two or more CSP systems.

This problem is solved in particular by an improved sensor assembly, and improved SCA with such sensor assembly and improved methods of tracking. Preferably, the problem is solved with the features of the independent claims and aspects. The dependent claims and aspects as well as the features described in the following are preferred additional or alterative embodiments.

In particular, the present invention provides a sensor arrangement as well as a method for tracking a CSP system.—Preferably, such CSP system comprises one or more parabolic trough collectors. Such a parabolic trough may be made of a number of solar collector modules (SCM) also referred to as solar collector elements (SCE) fixed together to move as one solar collector assembly (SCA), herein also referred to as SP. Each SCA is an independently-tracking parabolic trough. Many SCA's may make up a solar plant or solar field.

As shown, the parabolic trough collectors SP focus the sunlight So onto an absorber tube or a so-called receiver R extending in the focal line. In the absorber tubes, the concentrated solar radiation is converted into heat and dissipated to a circulating heat transfer medium.

The parabolic troughs usually track the sun only uniaxially. Therefore, they are preferably arranged in north-south direction and track the sun or are tilted only according to the solar altitude during the course of a day. This tracking or tilting is achieved by a tilting/pivoting the parabolic trough/SCA about a tracking or tilting axis (as schematically illustrated in FIG. 2).

The solar collector elements (SCE) of a solar collector assembly (SCA), also referred to as a parabolic trough, SP often only form half of the parabolic trough when seen in cross section through the longitudinal axis of the parabolic trough and may leave a gap at the deepest point of the trough. The SCA is positioned, supported and guided by a supporting structure or guide matrix which holds the solar collector elements (SCE). Also, there may not even be a gap but the parabolic trough may be closed at its deepest point. The discussion of the present invention herein includes the previously described designs but is not limited thereto.

The present invention particularly relates to a sensor arrangement for tracking a concentrated solar power system, preferably a solar collector assembly (SCA), the sensor arrangement comprising a housing. Said housing comprising, preferably housing an inclination sensor, a camera. The sensor arrangement may also comprise a shadow receiver, which is preferably connected to said housing. Said shadow receiver being arranged and adapted to receive the full shadow of a solar system's receiver tube, wherein the camera and the shadow receiver are arranged such that the camera may sense the, preferably full width of the, receiver tube's shadow on the shadow receiver.

The sensor arrangement is preferably adapted so as to allow mounting thereof in the area, i.e. in the vicinity, of the apex of a parabolic trough mirror and to receive the shadow of the receiver tube.

Preferably, the sensor arrangement is adapted so as to allow mounting thereof in the area of the apex of a parabolic trough mirror outside, in other words behind (when seen from the focal line's perspective) or underneath (when seen from a gravity point of view with the parabolic trough in its neutral position, e.g. as seen in FIG. 2, middle). The sensor arrangement is then preferably mounted to the support structure, also referred to as torsion box of the parabolic trough, Alternatively, the sensor arrangement may be mounted within the parabolic trough mirror, preferably to a support structure extending from the trough's apex and supporting the receiver pipe.

The sensor arrangement may comprise at least one, preferably two, preferably substantially parallel, side shield(s). The side shield(s) may extend along at least the whole length and/or height of the housing's sides. The side shield(s) may also be larger than the side of the housing and extend beyond the housing's boundaries. The side shield(s) may be spaced from the housing.

The side shield(s) may protect the sensor arrangement from focused sunlight which possibly hits the sensor arrangement and may lead to overheating. While the sensor arrangement's optimal position is such that it is mainly in the shade, particularly the shade of the receiver tube, the arrangement may be or get in the path of excessive sun reflection, e.g., of secondary focal lines which may occur particularly during start up. This may lead to excessive heat and the risk of damages.

Preferably, each side shield is spaced from the housing via at least one spacer. Such spacer may be made of or comprise a heat resistant material with low thermal conductivity, e.g., PTFE. The side shield may be made of metal or alumina.

The side shield may comprise at least three slits. This may increase air circulation, reduction of vibrations as well as avoidance of tension or buckling.

The sensor arrangement's housing is preferably substantially prismatic or box shaped. The camera and the inclination sensor are arranged within said housing. The shadow receiver may be attached to or only partly contained in but extend from said housing.

The shadow receiver preferably is a planar, flat, member. It preferably has a matt finish or color (for example white, broken white, champagne). It shall, preferably, uniformly reflect the RGB spectrum.

The camera is preferably positioned at an angel to the shadow receiver, said angle preferably being less than 90°, and preferably about 30° to 60°, preferably about 35° to 55°, preferably about 40° to 50°, and, for example, at about 45°, or less.

The angle may be chosen depending on the given parameters, such as the camera's focal length.

The type of camera may be a single line or multi line CCD or CMOS camera. Multi line may be preferably since it allows analysis of multiple lines, which may be beneficial to recognize and ignore artifacts and/or pollution in the shadow picture. As a camera sensor, for example, SONY Exmor IMX323 sensor, resolution 1920×1080 Pixel, lense: 3.6 mm (F: 1,4) has proven suitable.

The distance between the camera and the shadow receiver is preferably such that the camera, at least at one point in time of the course of the receiver tube's shadow over the shadow receiver during a day senses the full shadow width of the receiver tube's shadow on the shadow receiver. Due to the advanced image processing algorithm preferably used along with the sensor arrangement of the present invention, is preferred that at one point in time the full width of the shadow on the shadow receiver may be sensed, even if only one side or boundary of the shadow can be sensed and/or even is the shadow is rather diffuse or weak.

The sensor housing may comprise two interfaces, preferably two (BUS-) Interfaces, such as LAN tcp/ip and CAN-BUS.

The sensor housing preferably comprises a thermal exchanger for cooling and/or heating the camera and/or the inclination sensor and/or associated electronic components, such as PCBs.

For example, the sensor housing may comprise a heating cartridge or heat pipe for heating components. For optimally distributing the heat, the sensor arrangement may comprise a copper plate. Such copper plate is preferably for conducting heat and/or cold, to and/or from the camera and/or the inclination sensor and/or associated electronic components. It may be made of a different material suitable for conducting heat and/or cold. It preferably connects the camera and/or the inclination sensor and/or associated electronic components with a heat source, such as a heating cartridge, and or cooling component(s). The plate may be about 1 mm thick, may have a width of between about 15 mm and 23 mm, particularly depending to the PCB size and substructure, and/or may have a length of about 195 mm, preferably when being uncoiled, without bends. This may allow efficient temperature control at reasonable price and space consumption.

Alternatively or in addition, the sensor housing may comprise structures to dissipate heat away from the camera and/or the inclination sensor and/or associated electronic components, e.g. a voltage regulator (dc to dc stepper). This may be advantageous in order to prevent overheating of the components in particularly hot environment and/or to obtain optimal operating conditions in hot or cool environments. Also, in areas where there are large temperature shifts between day and night time, freezing of the sensor arrangement at night and/or overheating during day time may be avoided. This assists in both scenarios, operation conditions as well as storing conditions.

Preferably, the housing comprises a main carrier onto which the camera and the inclination sensor are mounted. This assists in improved predefined positioning of the camera with regard to the inclination sensor. In addition, the main carrier may also serve as mounting base for the shadow receiver and/or for mounting the housing to the solar power system. This may further improve accuracy and reliability of the sensor output and thus lead to an improved tracking and thus improved efficiency of the SCA or the solar field.

One or more sensor arrangements, preferably three, is/are mounted to each SCA. The sensor arrangement is controlled by a controller. This may be a local controller, which may, e.g., be located in the solar field and which may, e.g., control two or four SCA's, or a central controller, which may, e.g., control a whole solar field. The central controller may be located locally, in a control building at or close to the solar field, or at a remote location. Communication between the sensor arrangement(s) and the controller may be based on wired or wireless (including the internet) connection. The controller may additionally control tracking of the SCA(s), e.g. by controlling respective mechanic or hydraulic drives, according to a desired temperature of the working fluid. The working fluid temperature is preferably sensed for each SCA by respective temperature sensors, preferably at the fluid inlet into the receiver tube (entry temperature) and at the fluid outlet of the receiver tube (outlet temperature).

The information sensed by the sensors, e.g., images, inclination values etc. is communicated to the controller. Said controller (which may also be a server) may also store individual or all of the sensor date, preferably along with additional operating data of the SCA/solar field. The controller also provides time data, i.e. a system time, which may be allocated to all sensed and/or stored information. This system time is also used to calculate the position of the sun, on which the respective tracking actions are based. The sensor arrangement is used to control the position (tracking angle) of the SCA(s).

The present invention moreover relates to a method for adjusting/referencing a sensor arrangement for tracking a concentrated solar power system, preferably a solar collector assembly (SCA), the system preferably being a system of the invention as referred to above and/or including a sensor arrangement as referred to above. The method may comprise the steps of mechanically adjusting the sensor arrangement on the CSP system; as well as of thermally adjusting the sensor arrangement together with the CSP system. More particularly, the mechanical adjusting relates to adjusting the mounting position of the sensor arrangement on a CSP system and its alignment therewith, in particular, the mounting position of the sensor system on a solar collector assembly (SCA), preferably as referred to above. The thermal adjustment of the sensor arrangement together with the CSP system may particularly involve determining an optimal position(s) of the solar collector assembly (SCA) with regard to the sun based on the thermal output of the heating fluid and aligning it with respective sensor data such as inclinometer data, camera, and/or time data. Such thermal adjustment may be made once, preferably for one SCA out of a number of SCAs or a solar field, to provide control information allowing improved tracking for a multitude of tracking cycles for more than one, preferably all, SCAs of the solar field.

The method preferably comprises the steps of mounting the sensor arrangement to a solar collector assembly (SCA), preferably in the area, i.e. vicinity, of the apex of the parabolic trough mirror, so as to be able to receive the full width of the shadow of the receiver tube, as already referred to above. Preferably, the sensor arrangement is mounted outside, i.e. behind or under the parabolic trough, preferably to the support structure such as the torsion box, or within the parabolic trough, preferably to a support structure supporting the receiver tube. Further steps may include adjusting the SCA and/or the sensor arrangement such that the receiver tube's shadow is received, in its full width, by the sensor's shadow receiver; and/or measuring an inclination value using an inclination sensor contained in the sensor arrangement, as well as taking and storing the time, and preferably date, along with a picture of the full width shadow taken by the camera contained in the sensor arrangement.

Mounting of the sensor arrangement to the support structure, particularly to the torsion box, allows a reliable and easy securing of the sensor arrangement to the SCA and thus mounting of the sensor arrangement to the SCA in predefined relationship to one another within very low tolerances. Usually, the support structure of an SCA is of high accuracy, particularly since it carries both, the reflector mirrors as well as the receiver tube which have to be mounted in predefined position with regard to one another in order to achieve a high degree of efficiency, as required. Also, the spatial vicinity of the sensor arrangement with regard to the apex of the parabolic trough of the SCA increases the reliability and accuracy of the sensor's position. Finally, the improved structure of the sensor arrangement, including camera, inclination sensor and shadow receiver within one unit or housing, and preferably all being carried by one base carrier, improves reliable relative positions and reduces the risk of misalignment. Optimal mounting may be achieved with sufficient accuracy based on visual judgment. Alternatively, a mounting mask may be provided.

The SCA is preferably adjusted such that the receiver tube's shadow, including the entire width of the shadow, moves along the shadow receiver, e.g. by moving the SCA from a first maximum inclination to a second maximum inclination or from shadow entry to shadow exit on the shadow receiver, while preferably sensing the shadow received by the shadow receiver and the SCA's angular position data, as well as communicating to and storing these data obtained by the camera and the inclination sensor along with associated time data on a local or central controller. Time data may be provided from the controller to which the sensor arrangement may be directly or indirectly connected. This allows an optimized setting of the sensor arrangement's measurement range as well adjustment of the relative positions of the sensor arrangement and the SCA including its receiver tube with regard to one another.

Adjusting the SCA may involve the step of storing information including sensing of the first shadow portion or boundary received on the shadow receiver, also referred to as shadow entry, sensing of the shadow centre, when the full shadow is received on the shadow receiver, and last sensing of the last shadow portion received on the shadow receiver, also referred to as shadow exit, along with the associated angular positions sensed by the inclinometer, the associated picture of the shadow as taken by the camera, and the associated time, and preferably date. This allows to take into considerations particularities of the scenario such as point in time and absolute sun position, inclination and absolute position of the SCA, also in view of gravity etc.

The above method steps are preferably performed twice, or at least twice, once from east to west and once from west to east, in other words in opposite directions. This may particularly allow to detect torsion along the parabolic trough and/or directional play in the bearings and or the drive train. Such influences may, once observed, readily be taken into account when interpreting and processing the sensed data in operation of the system, preferably without having to involve complex and expensive maintenance work. Preferably, such information is stored by the controller. It may then be used, either as direct position information or calculated based on the stored measurement data, for subsequent tracking and positioning of the SCA.

The mounting of the sensor arrangement to the SCA may be effected with a tolerance of +/−2°, preferably +/−1.5° and more preferably +/−1° or less of the sensor's desired or reference orientation. Similarly, the mounting of the sensor arrangement to the SCA may be effected with a tolerance of in translatory displacement perpendicular to the tracking axis of about +/−3-5 mm, preferably about +/−2-3 mm of the sensor's desired or reference position.

Translatory displacement along the tracking axis (pivoting axis) has no relevant influence. Translatory displacement orthogonally to the tracking axis, if of relevant influence, may be nivelated during the thermal adjustment/referencing, as further discussed below.

Preferably, three sensor arrangements are mounted to one SCA, preferably one sensor arrangement at each end of the SCA and one sensor arrangement in the middle of the SCA, as seen along the longitudinal axis of the parabolic trough. This may allow optimized control of the SCA's position along its whole length as well as recognition of, e.g., torsion variations or other artifacts and to thereby improve the system output. If the SCA comprises two, three or more sensor arrangements mounted thereto, the respective method steps apply to two, there, more or all sensors. Torsion may be detected with at least two sensors, one of which preferably being mounted at the driving end/position (which may often be in the middle of the SCA).

In addition or alternative to the above referenced mechanical adjustment, a thermal adjustment may be made. Therein, the temperature of a heating liquid heated by at least one and preferably just one SCA (particularly when considering a solar field with a plurality of SCA's) is sensed. For the describing the position of an SCA, inclination angles may be used, which may correspond to those sensed by the inclination sensor. For example, an angle of 90° may refer to orientation of the SCA (particularly the parabolic trough opening) to the east. 270° may indicate the orientation to the west, whereas 180° may refer to an upright position (see middle of FIG. 2) which may reflect solar noon. Based on a given angular position range for collecting sun energy during the course of a day, including, e.g., from 110° to 250°, the angular positions at, e.g., 110°, 145°, 180°, 215°, and 250° may be taken as reference positions. Here, said positions may be approached stepwise, i.e. with angular steps. Said steps preferably lay in the range from 0.01° to 1°, more preferably from 0.05° to 0.5° and more preferably from 0.1° to 0.2°, while continuously measuring the fluid inlet and outlet temperature and calculating the temperature difference between fluid inlet and outlet temperature for each step/position. The time between two steps is preferably such as to allow the temperature change, particularly increase or decrease, of the working fluid from the receiver tube inlet (inlet temperature) to the receiver tube outlet (outlet temperature) to approach a stationary state. Based on the measured temperature differences, the optimum position, i.e. the position with the highest temperature difference, may be determined. Preferably, the camera senses shadow information and the inclinometer senses angular information at all respective angular positions and respective information is stored, preferably at a central system, e.g. the above discussed controller, to which the sensor sends the respective information, e.g. via an interface. Each respective shadow information may then be considered to represent a respective power state (based on. e.g. the sensed temperature and inclination information, preferably along with sun position and time information) so that, in subsequent control, it may be relied on the shadow information for adjusting the power output level of the SCA. Thus, allocating reference thermal output information to shadow information may improve processing of the shadow images and effective positioning of the SCA relative to the sun. Since the mechanical and structural behavior of the SCA's of a kind in a solar power field may be considered to substantially correspond to one another, the information obtained by thermal adjustment of one SCA may be transferred to other SCA's under corresponding conditions, e.g. SCA's of a kind in one solar field. Thermal adjustment may thus allow improved interpretation of camera information (base on a shadow picture. Also, in use, this allows improved control, particularly as regards percentages of the maximum power level, of the SCA position(s). This applies to individually desired output temperatures but also allows to set up an optimized, individualized performance curve allowing improved positioning of one SCA or of a number of SCAs of a solar field with regard to a specific target output temperature. In this way, improved control of the working fluid outlet temperature and thus an improved lefel of performance of the SCA or the solar field is provided.

Independently of the above discussed thermal adjustment, which is preferably only performed for one SCA among a field of multiple SCA'S, an SCA or each SCA of a field of SCA'S may be further adjusted, by sensing the temperature of a heating liquid heated by the (or each of the) SCA(s), wherein, for a given angular position of shadow entry on the shadow receiver, said angular position is approached stepwise (with angular steps), said steps preferably laying in the range from 0.01° to 1°, more preferably from 0.05° to 0.5° and more preferably from 0.1° to 0.2°, while continuously measuring the fluid inlet and outlet temperature and calculating the temperature difference between fluid inlet and outlet temperature, as referred to above. The time between two steps is preferably such as to allow the temperature change from inlet to outlet to approach a stationary state, wherein, once said temperature difference exceeds 1K, preferably 2K, 4K or 6K, the respective angular position and/or the respective camera picture are stored, preferably along with respective time and/or sun position data, and considered to represent the daily start position for the respective SCA's tracking. The maximum temperature raise for each desired tracking position may be 25K. Thus, alternatively or additionally, the SCA may be stepwise repositioned tracked until the maximum temperature change from inlet to outlet in a stationary state is achieved, the respective angular position and/or the respective camera picture are stored, preferably along with respective time and/or sun position data, and considered to represent the daily start position for the respective SCA's tracking. Depending on the step width, this may, at preferred steps of 2K, result in a maximum of about 12 steps for establishing a first performance curve. This curve may be mirrored to obtain the respective information for the opposite tilting direction. Alternatively, some more steps may be taken to also obtain information beyond the optimum position providing the performance curve for decreasing performance beyond the point of optimum tracking. This allows easy and reliable determination of a reference starting position for each SCA. This procedure may be taken only once for setting up the SCA and its control. For, e.g., yearly, revision, however, said procedure may be run again. Season differences etc. may be considered by way of calculation but do not necessarily require readjustment.

In case an SCA comprises more than one sensor arrangement, the above discussed method steps are simultaneously performed for all sensor arrangements of one SCA.

A performance curve, e.g. from 0-100%, may be determined based on the sensed information according to the above method steps. Said performance curve, which may be applicable to one or more or all SCA's of a solar field, may advantageously be used for optimized control of the individual SCA or a whole solar field.

In case of tracking a concentrated solar power field including two or more SCAs, as also addressed above, the SCAs preferably each comprise a sensor arrangement as discussed herein. The method for adjusting and/or controlling the solar field preferably is a method according to the above discussions. In particular, the mechanical adjustment and/or the thermal determination of the entry position is preferably performed for more than one, preferably all SCAs. The thermal adjustment, however, is preferably performed for less than all, preferably one SCA.

For a solar field comprising a plurality of SCA's, a performance curve for one or more of the SCAs is determined and the concentrated solar power field is and for thermally balanced by individually controlling the exit temperature of the thermal fluid of the of each SCA. The performance curve may either be determined for one or more or all of the SCA's or be determined for one or more SCA's and then be equally used for the remaining SCA's.

Further example embodiments of the invention are exemplarily described in the following with reference to the drawings. These drawings are only schematic illustrations which in order to clarify specific aspects often do not depict other (optional) elements or consider different optional interconnected aspects in one illustration. Equal reference signs refer in this connection to equivalent, similar, comparable or equal components in the illustrated embodiments.

The described embodiments can be modified in many ways within the scope of protection of the claims. It is to be noted that the features of the aforementioned embodiments can be combined in one single embodiment. Depending on their configuration, embodiments of the invention therefore can comprise all or only some of the aforementioned features. The disclosure of the Figures is not intended to restrict the scope of protection of the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3a shows an example of the cast shadow of a receiver tube of a parabolic trough in the collector, FIG. 3b shows a simplified rendered illustration of the cast shadow of a receiver tube of a parabolic trough plant in the collector, FIG. 3c shows a simplified rendered detail of the cast shadow of a receiver tube of a parabolic trough plant in the collector, FIG. 3d shows a simplified rendered illustration of the cast shadow of a receiver tube of a parabolic trough plant in the collector, FIG. 3e shows a simplified rendered detail of the cast shadow of a receiver tube of a parabolic trough plant in the collector, FIG. 13 shows a cross section taken along line D-D in FIG. 10, FIGS. 14*a*, 14*b* and 14*c* show a shadow falling onto the shadow receiver, wherein FIGS. 26*a* and 26*b* shows a comparison of a solar field output, wherein FIG. 26*a* shows a regular, known control and adjustment of the individual loops, and wherein FIG. 26*b* shows a control and adjustment according to the present invention, FIGS. 27*a* and 27*b* shows temperature difference profiles for thermal determination of an SCA, wherein FIG. 27*a* shows a temperature difference profile determined from step-wise inclination measurements, and wherein FIG. 27*b* shows a temperature difference profile determined from a single test inclination.

DETAILED DESCRIPTION

Figure 1:
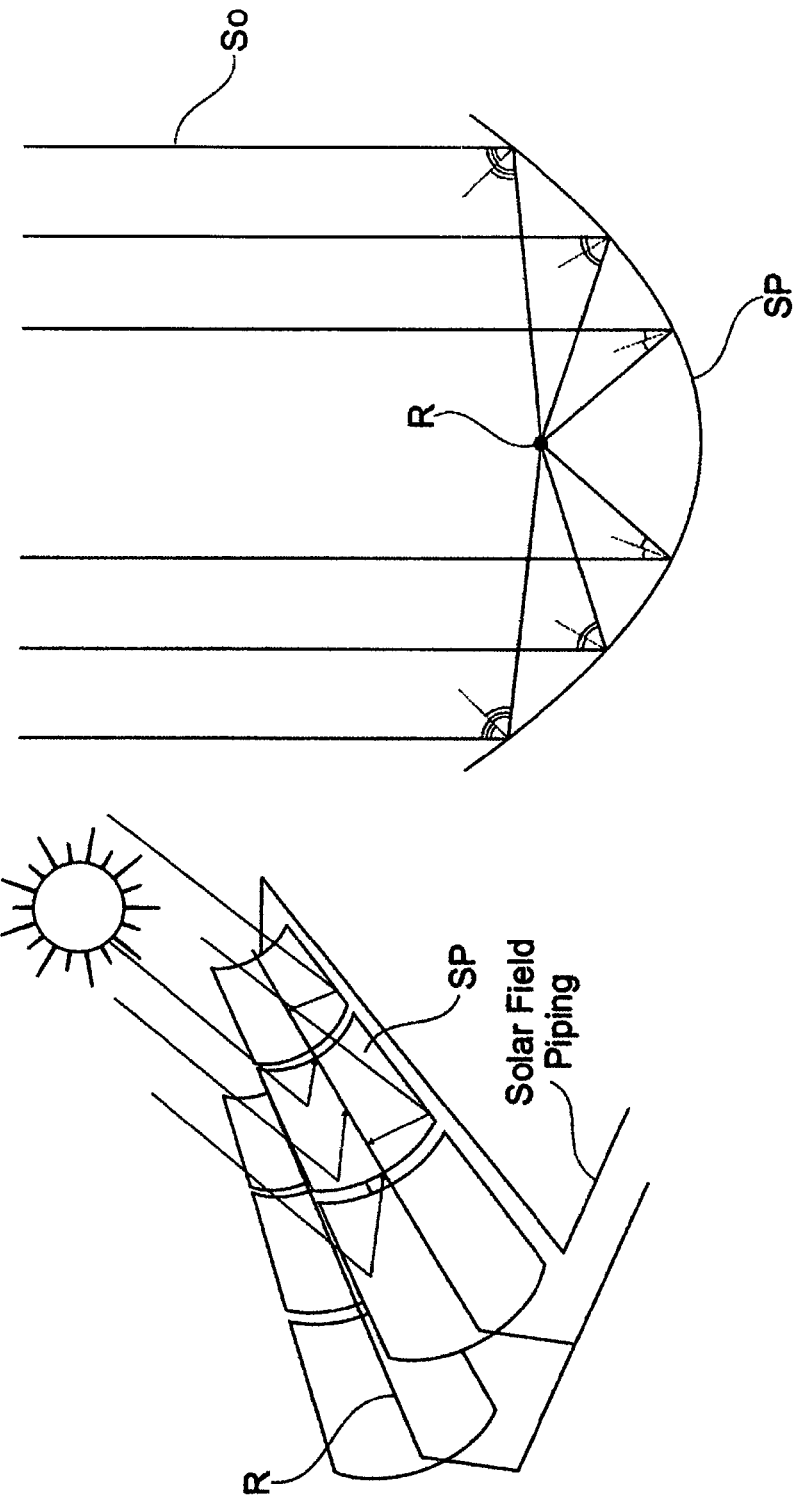
FIG. 1 shows a schematic illustration of a parabolic trough power plant.

As discussed above and in the background of the invention, which also relates to features of and related to the present invention, a system of a parabolic trough, i.e. a solar collector assembly (SCA) is exemplarily shown in FIG. 1. A parabolic trough or solar collector assembly (SCA) comprises a linear parabolic reflector SP made of a number of solar collector modules (SCM) fixed together to move as one SP that concentrates light onto a receiver positioned along the reflector's focal line. A receiver tube is positioned directly above the middle of the parabolic mirror at its focal line and filled with a working fluid. The reflector follows the sun during the daylight hours by tracking along a single axis. A working fluid such as molten salt or oil is heated to 150-400° C. (oil) or 200-550° C. (molten salt) as it flows through the receiver, from a receiver entry to a receiver exit. The hot fluid can be used for many purposes. Often, it is piped to a heat engine, which uses the heat energy to drive machinery or to generate electricity, or to a thermal energy storage.

Figure 2:
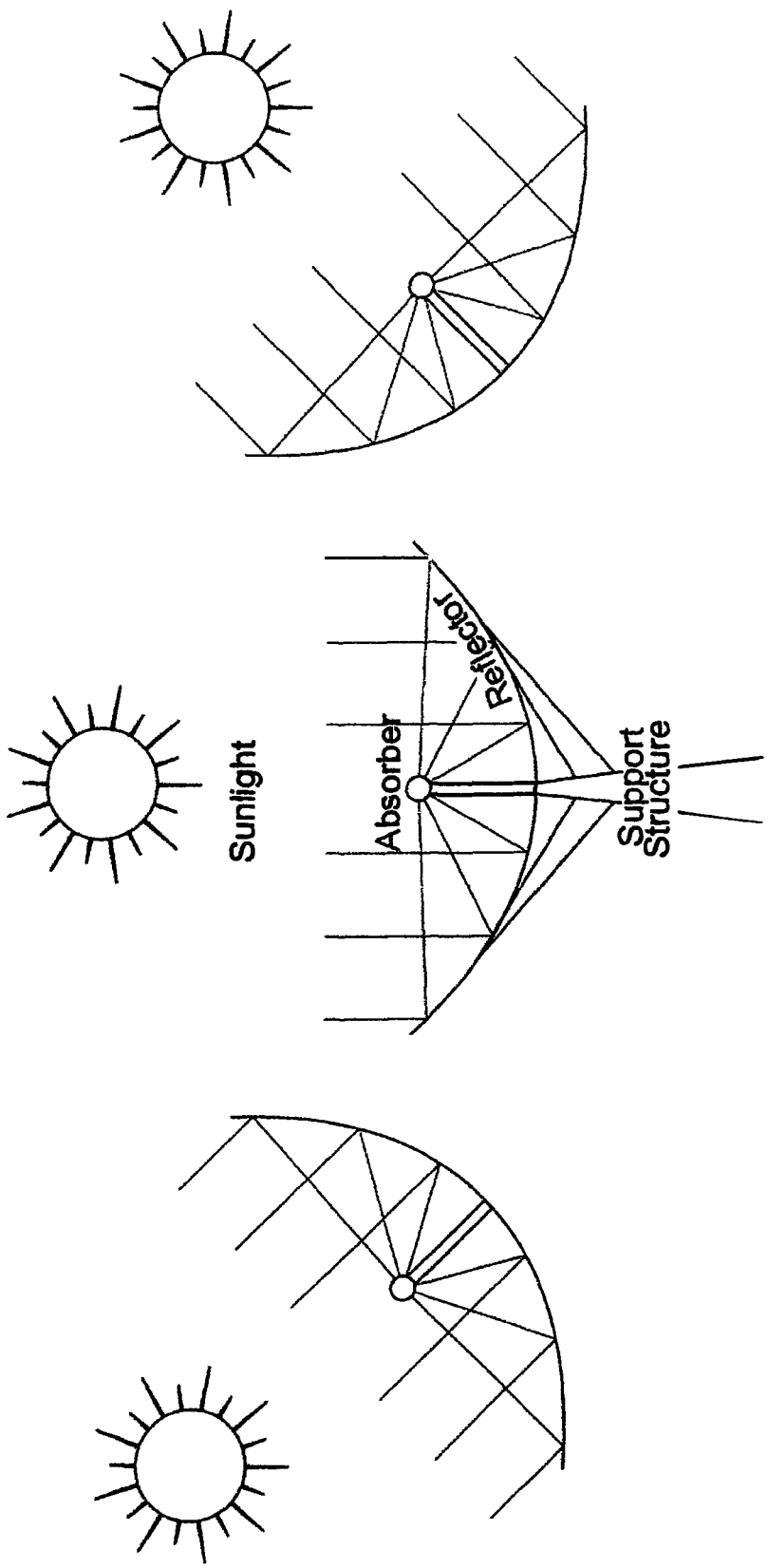
FIG. 2 shows a schematic illustration of its alignment according to the position of the sun.

The parabolic trough is usually aligned on a north-south axis, and rotated, from east to west, to track the sun as it moves across the sky each day (compare FIG. 2).

FIG. 3*a* illustrates an example of the cast shadow of a receiver tube in the collector. In the shown alignment of the receiver and the collector of an SCA, the shadow S of the receiver tube R (not visible in the Figure) is not directly on the collector mirrors but on a beam T of the substructure. In conventional parabolic trough designs, they are formed of two mirror rows made of curved mirrors or solar collector assemblies SP and arranged symmetrically with respect to a centre line. The mirrors SP are arranged on opposite sides of a beam T extending centrically longitudinally. When the trough is optimally aligned with respect to the sun, the shadow SR of the receiver tube R falls centrically onto the beam, as indicated in the illustration according to FIG. 3*a*. According to the sensor arrangement and method of the present invention the shadow preferably falls onto a shadow receiver of the sensor arrangement, as will be discussed below. It is clear that any shadow receiver can be used instead of the beam T, which is herein exemplary referred to, particularly in order to explain the general background of the sensing of the receiver tube's shadow.

The illustration according to FIG. 3*b* shows a scenario according to FIG. 3*a* in a rendered version. Supporting components of the collector arrangement have been omitted (such as, e.g., struts of the receiver tube, which seems to be freely floating but actually is mechanically fixedly positioned via a receiver tube support structure) in order to improve the illustration. In addition to the illustration in FIG. 3*a*, FIG. 3*b* reveals the reflection Refl. of the receiver tube R on the mirror SP. This reflection varies depending on the change in the viewer's location, in contrast to the shadow SR, which is independent from the position of the viewer. FIG. 3*c* illustrates a detail of the rendered illustration according to FIG. 3*b* in which the receiver tube is not visible.

FIG. 3*d* shows a further exemplary view of a scenario according to FIG. 3*a* in a rendered version. Supporting components of the collector arrangement have again been omitted (such as, e.g., struts of the receiver tube, which seems to be freely floating but actually is mechanically fixedly positioned via a receiver tube support structure) in order to improve the illustration. FIG. 3*d* also reveals the reflection Refl. of the receiver tube R on the mirror SP. Due to the different location of the viewer, the reflection is here at another place.

FIG. 3*e* shows a detail of a rendered illustration according to FIG. 3*b* or FIG. 3*c* in which struts RST forming a receiver support structure for the receiver tube R can be seen just like respective reflections.

Figure 4:
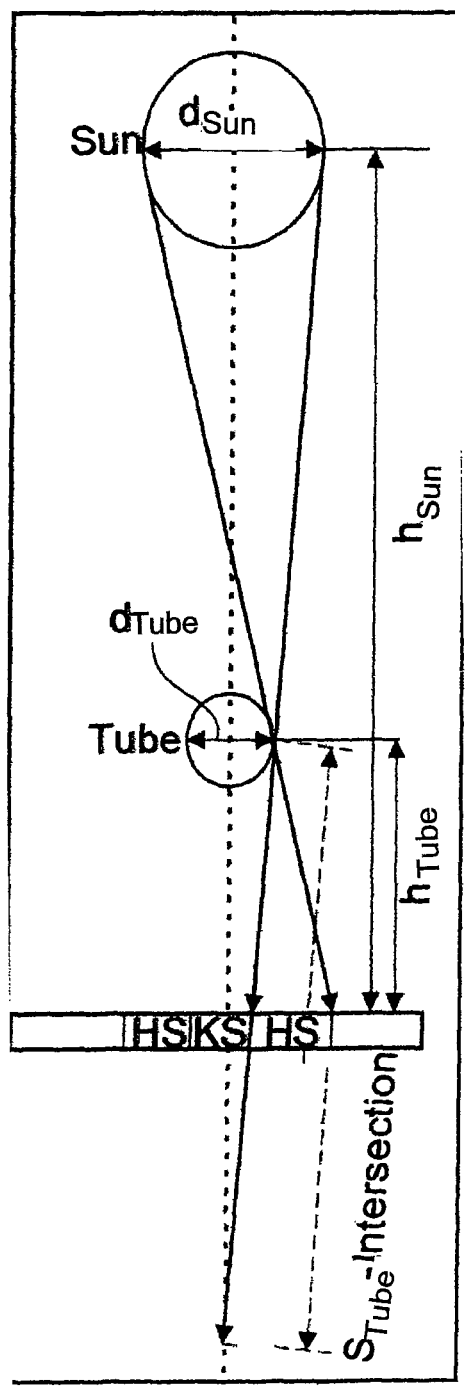
FIG. 4 shows the geometric conditions of the cast shadow using the example of the receiver tube shadow.
Figure 5:
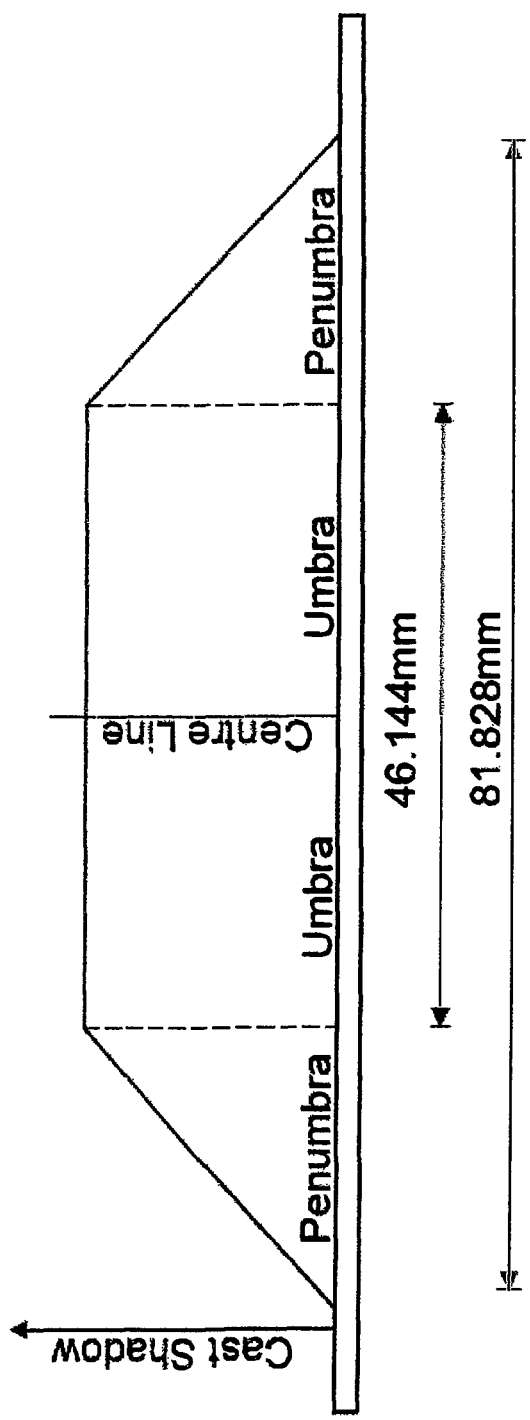
FIG. 5 shows a schematic illustration of an exemplary shadow of the receiver tube on a shadow receiver, wherein the central umbra and the lateral penumbras are highlighted.

FIG. 4 depicts the geometric conditions of the cast shadow via the example of the receiver tube shadow and FIG. 5 schematically shows the shadow and explains what is meant by the terms or regions of shadow (umbra) KS and half shadow (penumbra) HS. FIG. 4 depicts the penumbra as the distance resulting on the shadow receiver between the intersections of the shadow receiver with two lines. These lines are the tangents at opposite sides of the sun and a side or point of the receiver, as illustrated in FIG. 4. The illustration in FIG. 4 shows the penumbra at the right side of the illustration. The left penumbra is respectively formed by using the tangents at the opposite side of the receiver tube. The umbra is the region between the penumbras.

The width of the penumbra is dependent on the distance of the shadow blind from the shadow receiver. All shadow parameters can be calculated via the sun diameter dsun, the receiver diameter dTube/Receiver (tube diameter in the illustration), the distance hTube between the receiver and the shadow receiver, for example the beam T, and the planet distance hsun between the sun and the shadow receiver. FIG. 5 exemplarily shows the shadow of the receiver tube on a shadow receiver, wherein the central umbra and the lateral penumbras are highlighted as well as preferred dimensions indicated. The sensor arrangement and method according to present invention analyze the geometry and intensity of the shadow, as it is discussed in WO 2016/107882, the contents of which are incorporated herein by reference, in order to track the SCA.

For the purpose of determining the deviation of the collector position from the optimum position, the position of the shadow of the shadow blind on the shadow receiver, preferably a shadow of the receiver tube on the shadow receiver is determined.

According to the present invention, a camera K, preferably an IP camera, is used in the sensor arrangement for detecting the shadow on the shadow receiver. Preferred cameras include line scan cameras or other color and brightness digitizing sensors.

The determination of two possible deviations is in particular alternatively preferred in the analysis of the shadow. On the one hand, the absolute deviation of the shadow (actual position in comparison to the target position) can be determined, which has an angular deviation, e.g., in degrees, or a position deviation from the centre or the centre line as the result. On the other hand, a deviation can be determined which has only a tendency (e.g., left or right) as the result. Both approaches are preferred and appropriate to reduce and preferably to eliminate deviations in tracking. The image processing of the shadow sensed by the camera is preferably processed and/or analyzed at a remote location, including a control server or a web-based program.

Figure 6:
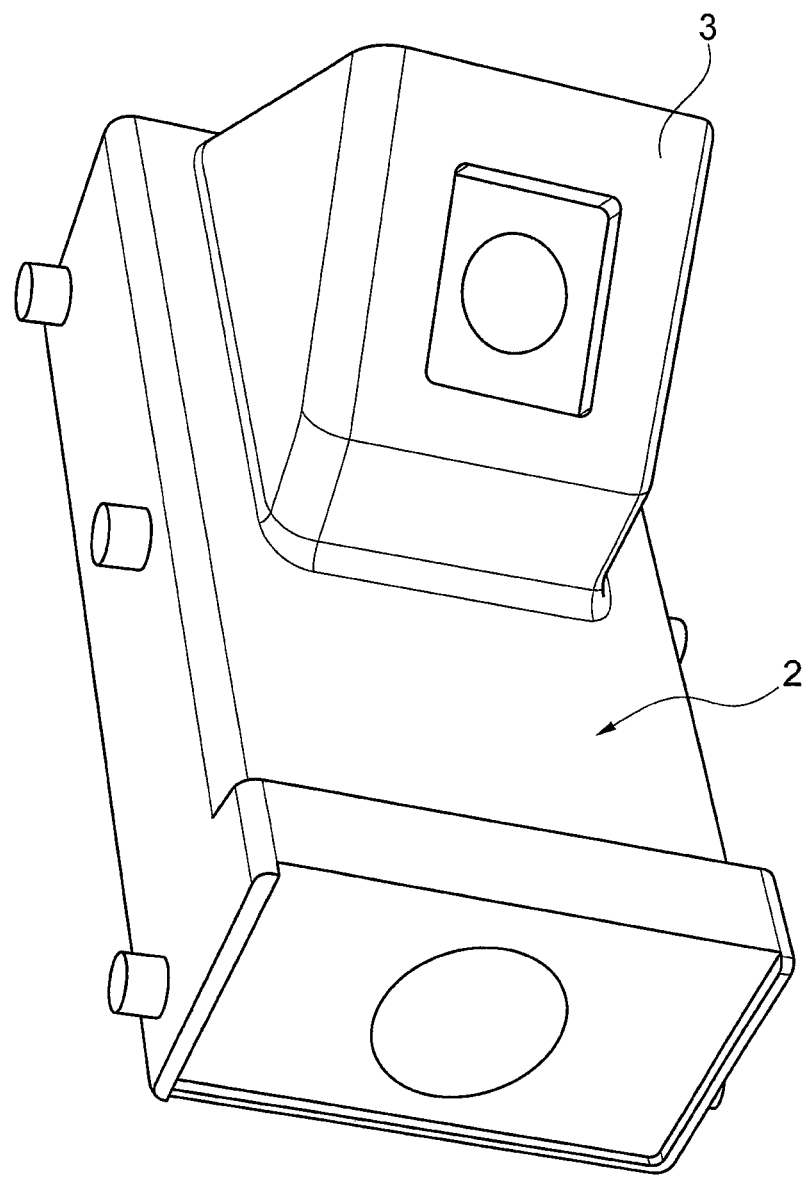
FIG. 6 shows a three dimensional view of an exemplary housing of a sensor arrangement according to the present invention.
Figure 7:
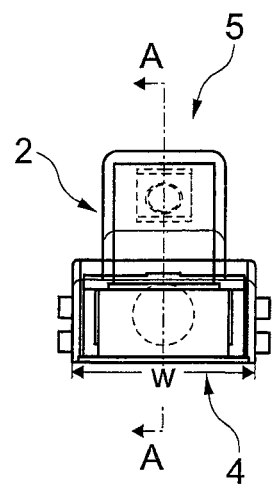
FIG. 7 shows a top view onto a housing.
Figure 8:
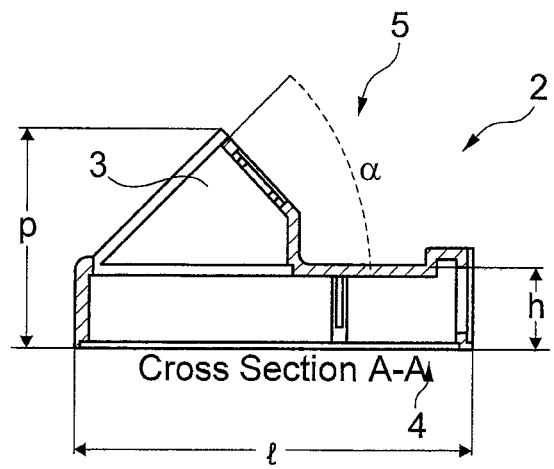
FIG. 8 shows a cross section through the housing of FIG. 7 along line A-A.
Figure 9:
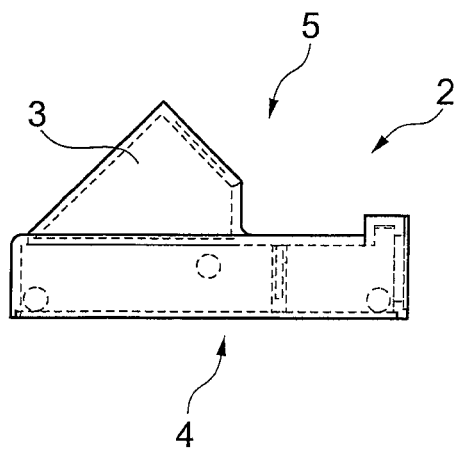
FIG. 9 shows a side view of said housing.

FIG. 6 shows a three dimensional view of an exemplary housing 2 of a sensor arrangement 1 according to the present invention. FIG. 7 shows a top view onto a housing 2, hatched lines indicating hidden structures. FIG. 8 shows a cross section through the housing of FIG. 7 along line A-A. FIG. 9 shows a side view of said housing, hatched lines indicating hidden structures. Housing 2 is of a generally cuboid or box like shape, preferably provided with a protruding portion 3 for housing and or positioning a camera at its front side 5. The housing preferably provides support for such camera at an angled position α of preferably about 30° to 60°, preferably about 35° to 55°, preferably about 40° to 50°, and, for example, at about 45° with regard to the, preferably planar, back side 4 and thus positioning plane of the housing. The housing preferably has a length l of preferably about 100 to 250 mm, more preferably of about 150 to 200 mm, for example of about 158 to 163 mm. The housing height h, not including protrusion 3, is preferably about 20 to 50 mm, more preferably about 30 to 40 mm. The height p of protrusion 3 is about 70 to 110 mm, preferably about 85 to 95 mm. The width w of the housing 2 is preferably about 60 to 90 mm, preferably 65 to 85 mm and preferably about 80 mm. These dimensions have proven particularly beneficial as regards limited size and improved options for positioning the housing in an SCA while, at the same time, allowing sufficient space for housing the required components and allowing easy and reliable assembly.

Figure 11:
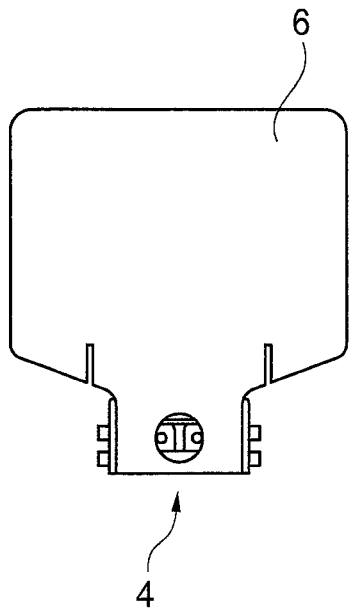
FIG. 11 shows a bottom view of the housing according to FIG. 10.
Figure 10:
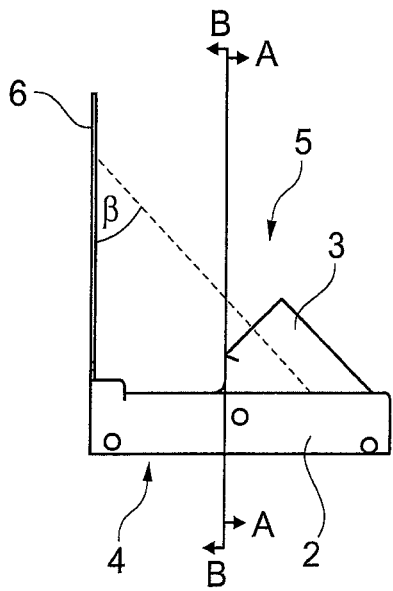
FIG. 10 shows a side view of a housing being provided with a shadow receiver.

FIG. 10 shows a side view of a housing 2 being provided with a shadow receiver 6 at its bottom end, opposite its top end, i.e. the end where protrusion 3 is located. Shadow receiver 6 is particularly well visible in the bottom view according to FIG. 11. Shadow receiver 6 preferably is a planar, flat member of a material or color suitable to allow recognition of a shadow falling thereon, preferably with good contrast. It preferably has a matt finish or colour (for example white, broken white, champagne).

This particularly allows optimum shadow receiving characteristics for optimized sensing by the camera. The corrosion resistance of the material is beneficially high. Also, coated materials may be used.

Figure 12:
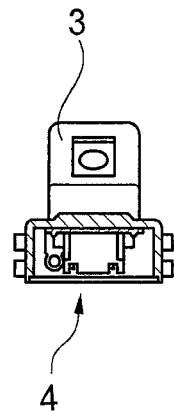
FIG. 12 shows a cross section taken along line C-C in FIG. 10.
Figure 13:
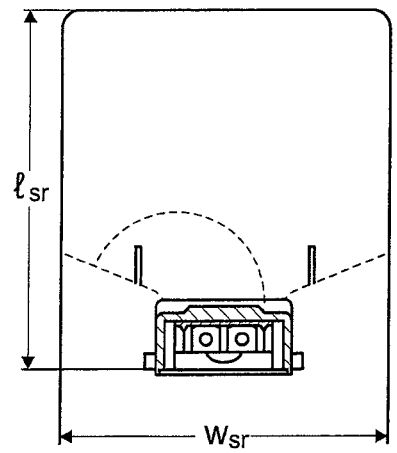

FIG. 12 shows a cross section taken along line A-A in FIG. 10, facing upwards, i.e. away from the shadow receiver 6 towards and just below protrusion 3. FIG. 13 shows a cross section taken along line B-B in FIG. 10, facing downwards, i.e. towards the shadow receiver 6, away from protrusion 3. The shadow receiver 6 extends from the housing 2 in the same direction as protrusion 3. Shadow receiver 6 extends from the housing 2 at an angle of about 90° to its, preferably planar, back side 4 and thus positioning plane of the housing 2. The preferred angle α of the camera axis, as referred to above, with regard to the preferably planar, back side 4 and thus positioning plane of the housing 2 can therefore be readily translated in an inclination angle β between said shadow receiver 6 and said camera position and camera axis, respectively (90°−α). This particularly allows an optimum viewing angle of the shadow received by or falling on the shadow receiver 6 by the camera as regards quality and size of the image, thus leading to optimized image recognition.

The shadow receiver 6, as measured from the housing's back side 4, preferably has a length lsr of about 120 to 300 mm, preferably 160 to 260 mm and, for example, of about 210 mm. The shadow receiver 6 preferably has a width wsr of about 100 to 300 mm, preferably 160 to 210 mm and, for example, of about 185 mm. The actual dimensions may depend on the receiver tube dimensions and/or the distance between the shadow receiver and the receiver tube. This size particularly ensures sufficient length and width to reliably receive the receiver tube's shadow, so allow a sufficiently large size (particularly length) of the image taken by the camera to allow optimized image processing, and/or to allow the shadow to move (widthwise) along the shadow receiver 6 while being processed. Also, the shadow receiver is particularly suited to be placed in the above referenced positions on an SCA.

Figure 14A:
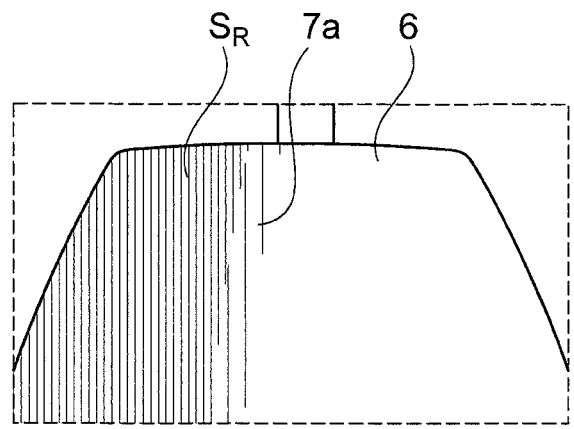
FIG. 14*a* shows a receiver tube's shadow entering the shadow receiver from the left.
Figure 14B:
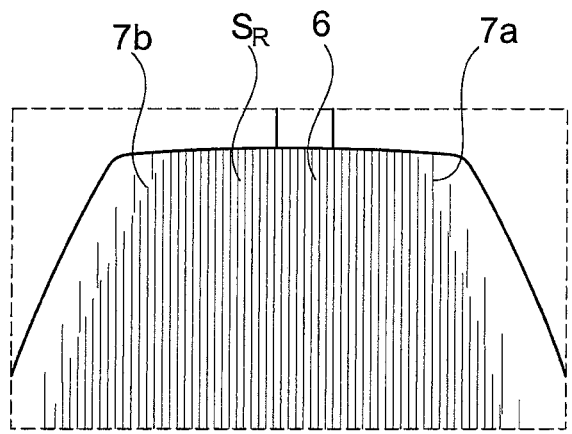
FIG. 14*b* shows a receiver tube's shadow being fully received on shadow receiver.
Figure 14C:
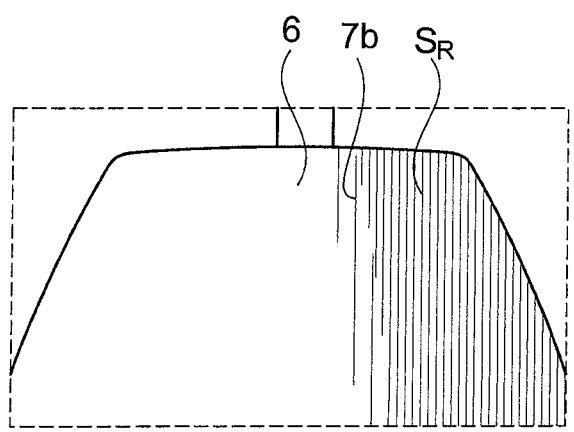
FIG. 14*c* shows a receiver tube's shadow leaving the shadow receiver to the right.

FIGS. 14a, 14b and 14c exemplary show a shadow S falling onto the shadow receiver. FIG. 14a shows a receiver tube's shadow SR entering the shadow receiver 6 with the right border or end 7a of said shadow being clearly visible. FIG. 14b shows a receiver tube's shadow SR being fully received on shadow receiver 6 with its right and left borders or ends 7a, 7b being clearly visible. FIG. 14c shows a receiver tube's shadow SR leaving the shadow receiver 6 with the left border or end 7b of said shadow being clearly visible.

Figure 15:
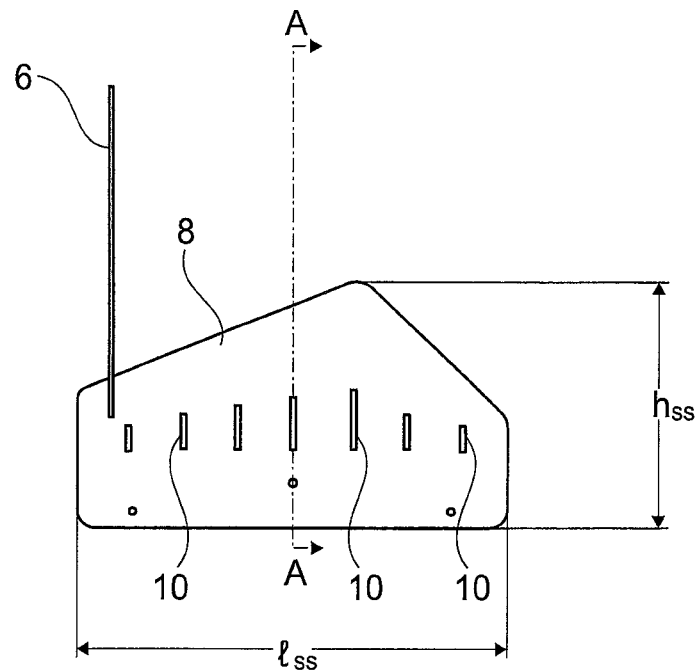
FIG. 15 shows a side view of a housing being provided with a shadow receiver as well as with two side shields 8.
Figure 16:
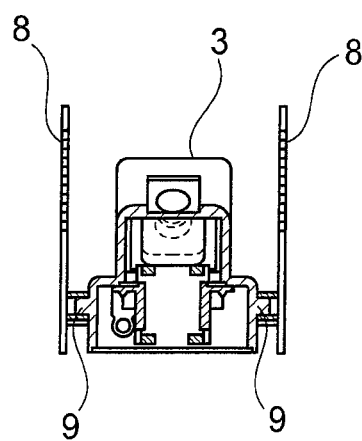
FIG. 16 shows a cross section taken along line A-A in FIG. 15.

FIG. 15 shows a side view of a housing 2 being provided with a shadow receiver 6, as discussed above, as well as with two side shields 8. Side shields 8 are connected to and extend along opposing sides of the housing 2, preferably at an angle of about 90° with the back side 4 and thus positioning plane of the housing 2, and preferably also at an angle of about 90° with the shadow receiver 6 (as visible in FIG. 16). FIG. 16 shows a cross section taken along line A-A in FIG. 15, facing upwards, i.e. away from the shadow receiver 6 towards and through protrusion 3. As can be readily taken from FIG. 16, side shields 8 are preferably parallel to one another. The side shield 8 preferably, extends along at least the whole length and/or height, preferably beyond the housing. In the shown preferred embodiment, the side shield 8 has a length lss of about 100 to 250 mm, preferably of about 150 to 200 mm and preferably of about 185 t 195 mm and/or a maximum height hss of about 90 to 130 mm, preferably of about 105 to 115 mm. Preferably, he side shields 8 are spaced from the housing.

The side shields preferably allow improved shielding of the sensor housing against thermal influences and heat, e.g. induced by secondary focal lines of the SCA.

The side shields 8 are preferably spaced from the housing via at least one spacer 9. Said spacer 9 is made of or comprises PTFE. However, other heat resistant materials of low thermal conductivity may alternatively be used. The side shields 8 are preferably made of metal or alumina. This allows an improved insulation of the housing 2 against the heat of the side shields 8 and, preferably, an optimized reflection of heat taken up by the side shields 8.

Preferably, as can be seen in FIG. 15, the side shield 8 comprises at least three, here seven, slits 10. The slits may have differing or the same length and/or width. This may increase air circulation, reduction of vibrations as well as avoidance of tension or buckling.

Figure 17:
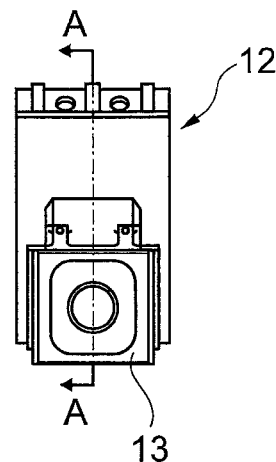
FIG. 17 shows a front view of a main carrier.
Figures 18, 19:
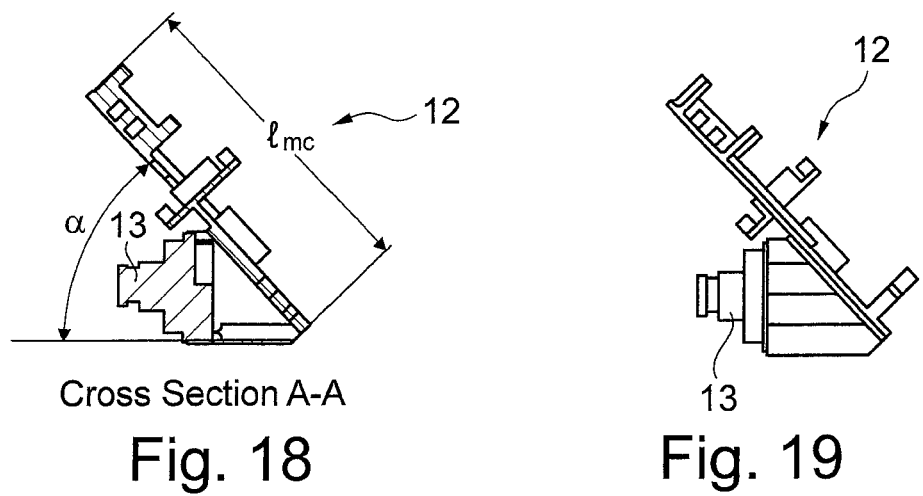
FIG. 18 shows a cross section through the main carrier of FIG. 17 along line A-A.
FIG. 19 shows a side view of said main carrier of FIG. 18.

FIG. 17 shows a front view of a main carrier 12. FIG. 18 shows a cross section through the main carrier of FIG. 17 along line A-A. FIG. 19 shows a side view of said main carrier 12. Said main carrier 12 is for being contained in said housing 2 and for supporting components of said sensor arrangement 1. Such components include a camera 13, an inclination sensor, interface structures and the like. The main carrier 12 may be made of high accuracy and allows improved and stable relative and/or predefined positioning of the components connected thereto, e.g. of the camera with regard to the inclination sensor. In addition, the main carrier may also serve as mounding base for the shadow receiver and/or for mounting the housing to the solar power system. This may further improve accuracy of the relative positioning of these components with regard to one another and thus reliability of the sensor output, thereby leading to an improved tracking. The length lmc of the main carrier 12 may be about 90 to 130 mm, preferably about 100 to 120 mm and preferably about 112 mm. The angle α between the camera and the main carrier's longitudinal extension (along which the length lmc is measured, see, e.g. FIG. 18 or 20) is preferably as angle α referred to above with regard to, e.g., FIG. 8.

Figure 20:
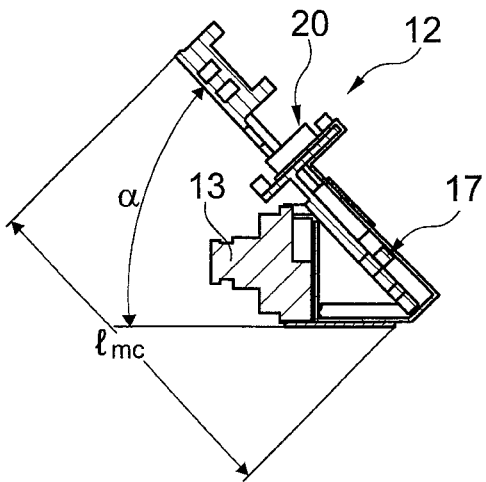
FIG. 20 shows a cross section through a main carrier as in FIG. 17 along line A-A, with a heating element.
Figure 21:
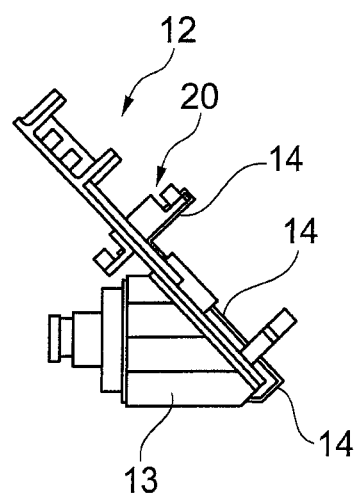
FIG. 21 shows a side view of said main carrier of FIG. 20.

FIG. 20 shows a cross section through a main carrier 12 as in FIG. 17 along line A-A and FIG. 21 a side view of said main carrier 12. Said main carrier 12 basically corresponds to the one shown in and discussed with regard to FIGS. 17, 18 and 19 but also comprises a heating element 14. Said heating element 14 is a plate, preferably a copper plate, which is adapted for transferring heat between and from different positions along the main carrier 12 and the components connected thereto, particularly a camera 13, an inclination sensor, preferably mounted at position 20 and other electronic components such as printed circuit boards (PCBs, converters etc. Said heating element 14 may either be directly (functioning as heat pipe) or indirectly (heated by additional heating element and transferring heat) heated to transfer heat to the relevant components of the sensor arrangement 1. This may assist in ensuring these components to maintain their required storage and/or operating temperature(s).

Figure 22:
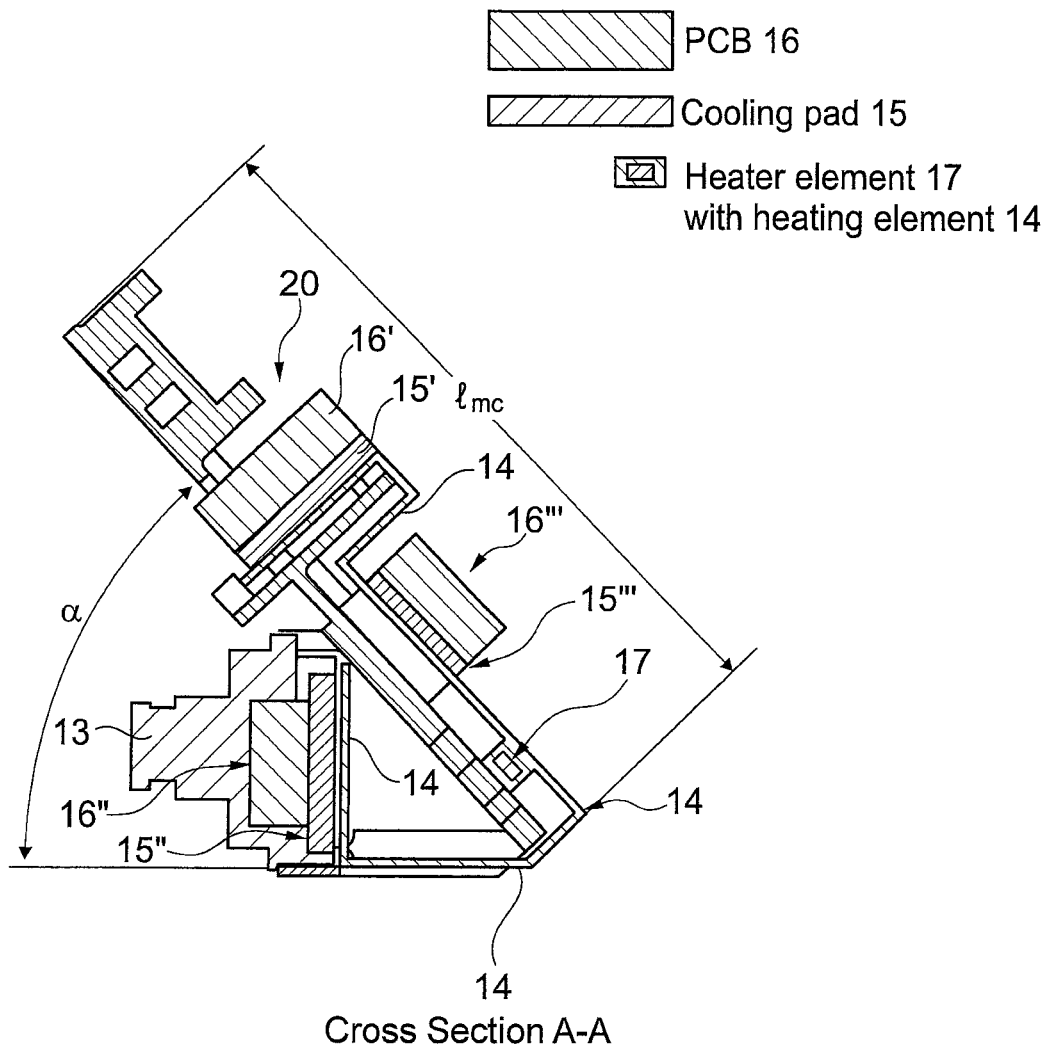
FIG. 22 shows a cross section corresponding to that of FIG. 20, showing main carrier and heating element as well as, additionally, indicating exemplary cooling elements associated to relevant electrical components.

FIG. 22 shows a cross section corresponding to that of FIG. 20, showing main carrier 12 and heating element 14 as well as, additionally, indicating exemplary cooling elements 15 associated to relevant electrical components. For example, a cooling element 15' may be associated with the inclination sensor (e.g. at position 20) and its PCB (indicated at 16'). A further cooling element 15" may be associated with the camera 13 and its PCB (indicated at 16"). Moreover, further cooling elements 15 may be allocated to additional electronic components such as, e.g. a cooling element 15'" may be associated with a converter PCB (indicated at 16'"), such as a DC to DC voltage regulator (preferably step down). The heating element 14 is heated by a heater 17 and transports heat to the discussed components. In addition, there may be provided an active or inactive cooling. In the preferred embodiment as discussed, cooling pads 15 allow an improved dissipation of heat and thus cooling of the relevant components.

The sensor arrangement according to the present invention can readily be mounted to an existing SCA or be integrated in new SCAs. It can readily be manufactures at low cost with high accuracy. For example, the shadow receiver may be made as a simple, laser cut part. The sensor housing may be made of a temperature and UV resistant plastic material, which may easily be injection molded at low cost. Accuracy of the housing is of less importance since the relevant parts are supported and positioned relative to one another by the main carrier. No fixation structures etc. for assembling various sensors or other components are required. Moisture absorbance or mechanical loads etc. do not need to be specifically taken care of as regards the housing design. The modular, platform like structure of the sensor assembly is of general advantage and allows mounting of different components as need arises.

The sensor arrangement can readily be mounted to, e.g., the support structure supporting the receiver tube, preferably at a location close to the apex of the SCA, i.e. at the bottom of and inside the trough. Alternatively, the sensor arrangement may be attached to the supporting structure, such as to a beam T as referred to above or at the position where the beam T is shown in the above discussion and referenced Figures. This is, preferably, in the area of a gap between the SCMs in the area of the apex of the SCA but outside, i.e. behind or underneath the SCA. Such mounting to the support structure has proven to be of great advantage, noting that the positional accuracy of the support structure with regard to the parabolic mirror arrangement of the SCA is of highest accuracy and since the relative positions of the inclination sensor, the camera and the shadow receiver are predefined within the sensor arrangement and need not to be altered upon mounting to an SCA in the field, thereby reliably maintaining high positional and sensor accuracy, as already referred to above. Neither highly qualified staff nor specific tools are required for mounting the sensor arrangement.

Figure 23:
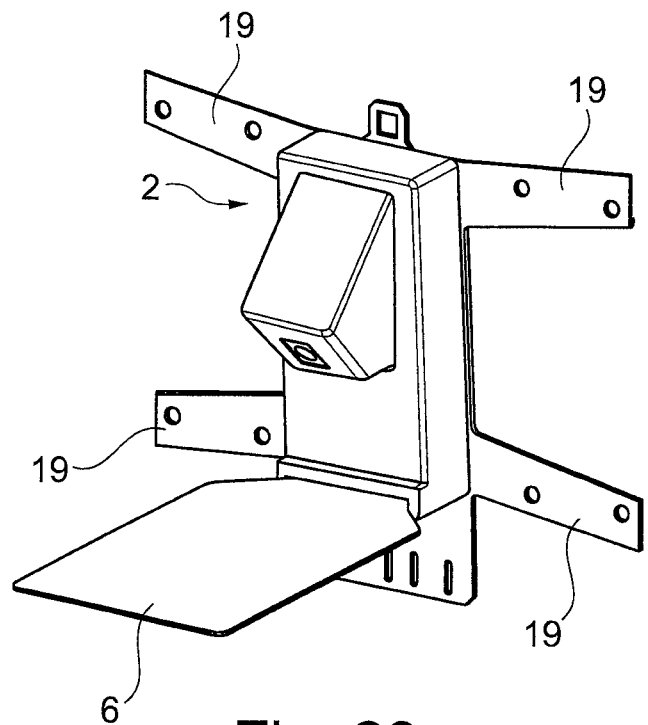
FIG. 23 shows a sensor housing for being mounted to a receiver tube's support structure.
Figure 24:
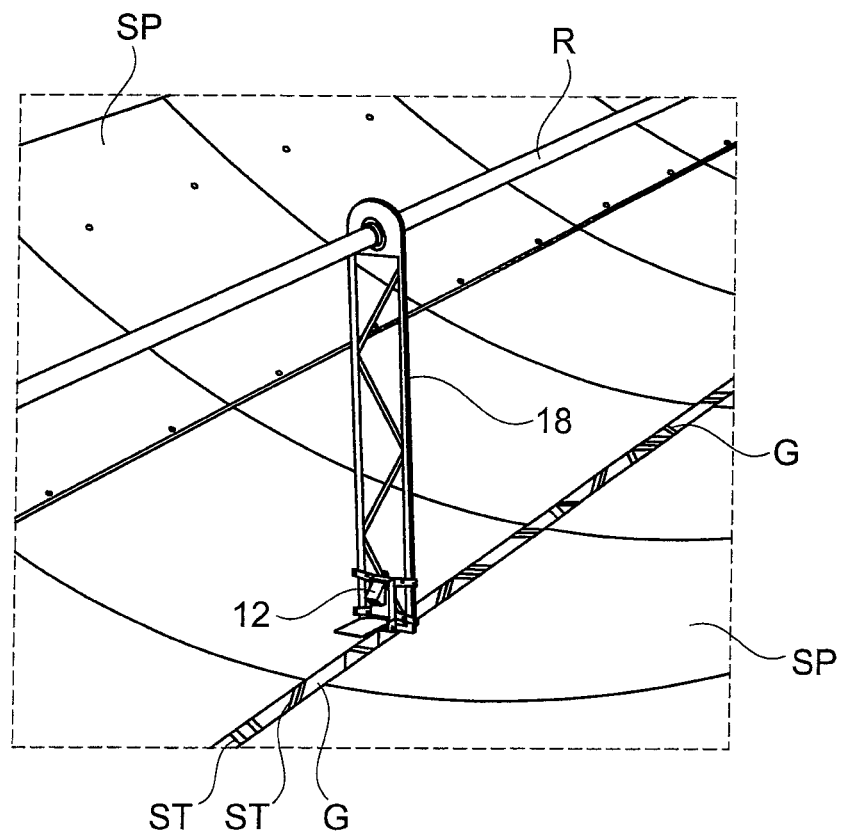
FIG. 24 shows a sensor housing being mounted to a receiver tube's support structure.
Figure 25:
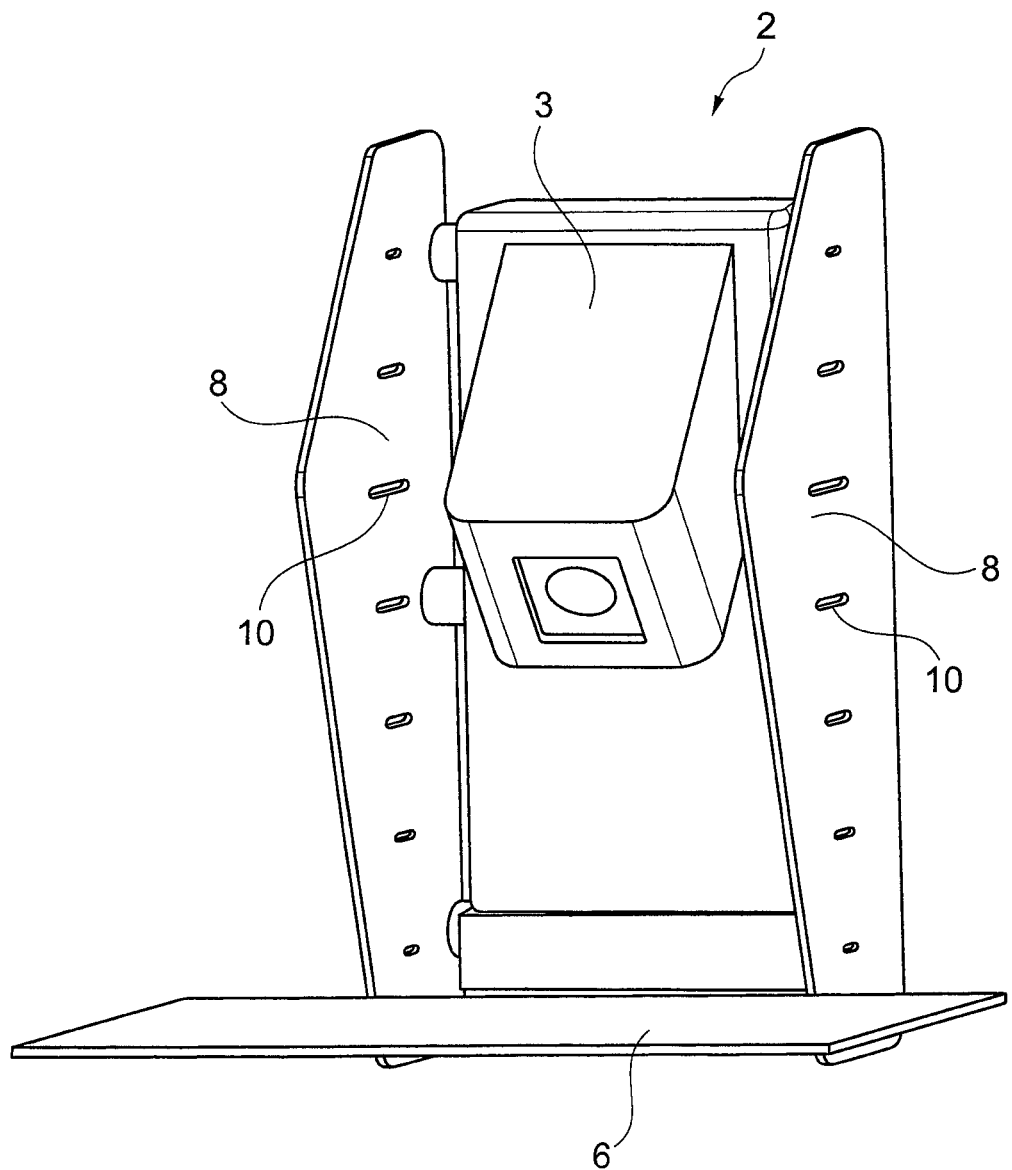
FIG. 25 shows a sensor housing with a shadow receiver and side shields.

FIG. 23 shows a housing 12 (here without side shields, which may, however, advantageously be foreseen) for being mounted to a receiver tube's support structure 18, as shown in FIG. 24, at a position close to the bottom of the SCA's trough, as also addressed before. Said housing 12 is preferably provided with four mounting members 19, extending sideways from both upper and lower corners of the housing, when seen in a front view. FIG. 25 shows a housing 2 with a shadow receiver 6 and side shields 8. Said housing 12 may be mounted to the support structure of an SCA at a position close to the bottom the trough but outside the trough by mounts provided at the housing's back side.

Such mounting situation on the support structure of an SCA are visualized in FIGS. 27a, 27b, 27c and 27e. Said Figure shows, in FIG. 27a, a sensor arrangement 1 according to the present invention. Arrows point, from said sensor arrangement 1, to locations/positions on an SCA as shown in FIGS. 27b, 27c, 27d and 27e. These Figures show parts of an SCA with mirror elements SP/modules SCMs, a receiver tube R and the gap G gap (as already discussed herein) at the deepest point of the trough. In addition, FIG. 27 indicated the support structure ST (as also already discussed herein), to which the sensor arrangement is mounted. It is to be noted that FIGS. 27a, 27b, 27c, 27d and 27e show mounting of the sensor arrangement in the area of the gap P at an end of the parabolic trough. However, mounting thereof, as described before, may also or additionally be effected to the support structure ST, e.g., in the middle of the SCA or distanced from an end thereof.

The housing 12 may comprise a humidity buffer for keeping the humidity within the housing in a constant range by either receiving humidity from the ambient air or by providing humidity to the ambient air.

The sensor arrangement according to the present invention as described herein, particularly the combined provision of a modular shadow sensing arrangement via a camera along with an inclination sensor, allows improved tracking of individual SCAs as well as of multiple SCAs in a solar field. Tracking may particularly be made easier and more reliable. In particular, the quality of repetitive positioning of an SCA, closely following the sun and achieving optimized position in relation to the sun, whether at maximum power or at defined reduced power position can be readily achieved. For example, the sensor accuracy of the sensor arrangement of the present invention has proven to be at about 0.003°. In general and depending on the setup of the SCA, the accuracy of the sensor arrangement may exceed the accuracy tracking drive, which is often a hydraulic drive. Still, an optimized absolute position of the SCA with regard to the sun, i.e. optimized tracking, may be achieved via the sensor arrangement and method described herein.

An example for a preferred camera is a sony exmor imx323 sensor on a PCB in camera hi3516 v200 cctv-ip-camera.

An example for an inclination sensor to be used with the present invention is BWL 315S CAN Bus single-Axis inclinometer.

For example, the sensor arrangement according to the present invention does not need to be specifically referenced or adjusted with regard to the construction of the SCA or with regard to an external reference inclination sensor. Rather, the sensor arrangement according to the present invention may be adjusted/referenced to the sun (and not to a part of the construction or a reference sensor). Such reference can be made at any point in (sun) time.

Since the accuracy of known systems suffers from various disadvantages, such as temperature drift of the sensor(s), age drift of the sensor(s) or other components, change in position of the base/fundament, tensions and resulting position changes of the construction, the adjustment or reference of such systems only lasts for a limited time. Contrary thereto, the present sensor arrangement and the adjustment going along therewith ameliorates or does not suffer from these disadvantages. The requirements for position accuracy upon mounting are low. The adjustment does not need surveillance or observation by skilled perSunl. No special equipment is required for mounting, sensing and or adjustment. Also, no additional reference sensor is required. Reference data may be stored centrally, e.g. in a database, and may be considered, also in relation to a solar field, upon demand. The adjustment or referencing may be automatically reiterated within predefined time intervals or upon, preferably automatic, observation of inaccuracies, e.g., based position changes of structural components and/or the base construction.

According to a preferred referencing method as discussed hereinbefore, the present invention moreover relates to a method for adjusting a sensor arrangement for tracking a concentrated solar power system, preferably a solar collector assembly (SCA). The solar system is preferably a system including a sensor arrangement of the invention as referred to above. The method may comprise the steps of mechanically adjusting the sensor arrangement on the CSP system; and/or of thermally adjusting the sensor arrangement together with the CSP system. More particularly, the mechanical adjustment relates to adjusting or referencing the mounting position of the sensor arrangement on a CSP system, in particular, the mounting position of the sensor system on a solar collector assembly (SCA), preferably as referred to above. The thermal adjustment of the sensor arrangement together with the CSP system may particularly involve determining an optimal position(s) of the solar collector assembly (SCA) based on the thermal output of the heating fluid and aligning it with respective sensor data such as inclinometer data, camera, and/or time data. This may subsequently allow improved tracking and optimized positioning of the SCA to the sun and thus 'harvesting' a maximum of sun energy, i.e. heating the working fluid to the highest possible or to the desired maximum temperature simply based on the receiver tube's shadow by way of image processing and/or the inclination sensor's output.

The method of mechanically referencing the sensor arrangement to the SCA preferably comprises the step of mounting the sensor arrangement to a solar collector assembly (SCA), preferably in the area, i.e. vicinity, of the apex of the parabolic trough mirror, so as to be able to receive the full width of the shadow of the receiver tube, as already referred to above. Preferably, the sensor arrangement is mounted outside, i.e. behind or under the parabolic trough, preferably to the support structure ST such as the torsion box, or within the parabolic trough, preferably to a support structure 18 supporting the receiver tube. Further steps may include adjusting the SCA and/or the sensor arrangement such that the receiver tube's shadow is received, in its full width, by the sensor's shadow receiver; and/or measuring an inclination value using an inclination sensor contained in the sensor arrangement, as well as taking and storing the time, and preferably date, along with a picture of the full width shadow taken by the camera contained in the sensor arrangement.

Mounting of the sensor arrangement to the support structure, particularly to the torsion box, allows a reliable and easy securing of the sensor arrangement to the SCA and thus mounting of the sensor arrangement to the SCA in predefined relationship to one another within very low tolerances, preferably of +/−2°, preferably +/−1.5° and more preferably +/−1° or less of the sensor's desired or reference angular position. Similarly, the mounting of the sensor arrangement to the SCA may be effected with a tolerance of in translatory displacement, perpendicular to the tracking axis, of about +/−3-5 mm, preferably about +/−2-3 mm of the sensor's desired or reference position.

Beneficially, potential translatory displacement orthogonally to the tracking axis may be balanced by the thermal adjustment/referencing, as discussed herein.

Usually, the support structure of an SCA is of high accuracy, particularly since it carries both, the reflector mirrors as well as the receiver tube which have to be mounted in predefined position with regard to one another in order to achieve a high degree of efficiency, as required. Also, the spatial vicinity of the sensor arrangement with regard to the apex of the parabolic trough of the SCA increases the reliability and accuracy of the sensor's position. Finally, the improved structure of the sensor arrangement, including camera, inclination sensor and shadow receiver within one unit or housing, and preferably all being carried by one base carrier, improves reliable relative positions and reduces the risk of misalignment.

As a further step of the mechanical adjustment, the SCA is preferably adjusted such that the receiver tube's shadow, including the entire width of the shadow, moves along the shadow receiver, e.g. by moving the SCA from a first maximum inclination to a second maximum inclination or from shadow entry to shadow exit on the shadow receiver, while preferably sensing the shadow received by the shadow receiver and the SCA's angular position data, as well as storing these data obtained by the camera and the inclination sensor along with associated time data. Time data may be retrieved from a control system to which the sensor arrangement may be connected, as discussed above.

This allows an optimized setting of the sensor arrangement's measurement range as well adjustment of the relative positions of the sensor arrangement and the SCA including its receiver tube with regard to one another. FIGS. 14a, 14b and 14c exemplary show the respective steps of a shadow moving over (here from left to right) the shadow receiver. FIG. 14a shows a receiver tube's shadow 7 entering the shadow receiver 6 with the right border or end 7a of said shadow being clearly visible. FIG. 14b shows a receiver tube's shadow 7 being fully received on shadow receiver 6 with its right and left borders or ends 7a, 7b being clearly visible. FIG. 14c shows a receiver tube's shadow 7 leaving the shadow receiver 6 with the left border or end 7b of said shadow being clearly visible.

Along with these steps, information is stored including sensing of the first shadow portion or boundary received on the shadow receiver, also referred to as shadow entry, sensing of the shadow centre, when the full shadow is received on the shadow receiver, and last sensing of the last shadow portion received on the shadow receiver, also referred to as shadow exit, along with the associated angular positions sensed by the inclinometer, the associated picture of the shadow as taken by the camera, and the associated time, and preferably date, along with further data as required. This allows taking into considerations particularities of the scenario such as point in time and absolute sun position, inclination and absolute position of the SCA, also in view of gravity etc.

These steps are simultaneously performed for all, preferably three, sensor arrangements on one SCA, as already addressed herein. Preferably, the above method steps are performed twice, or at least twice, once from east to west and once from west to east, in other words in opposite directions. This may particularly allow detection of torsion along the parabolic trough and/or directional play in the bearings and or the drive train. Such influences may, once observed, readily be taken into account when interpreting and processing the sensed data in operation of the system, preferably without having to involve complex and expensive maintenance work.

As discussed before, three sensor arrangements are mounted to one SCA, preferably one sensor arrangement at each end of the SCA and one sensor arrangement in the middle of the SCA, as seen along the longitudinal axis of the parabolic trough. This may allow optimized control of the SCA's position along its whole length as well as recognition of, e.g., torsion variations or other artifacts and to thereby improve the system output. If the SCA comprises two, three or more sensor arrangements mounted thereto, the respective method steps apply to two, three, more or all sensors.

In addition or alternative to the above referenced mechanical adjustment, an automatic thermal adjustment may be made. Aim of this thermal adjustment may be to determine the SCAs position achieving the highest thermal output, i.e. the highest temperature difference in fluid temperature between fluid inlet and fluid outlet of the receiver tube, for (one or more) given sun position(s), as well as to determine a performance curve, beneficially from 0% to 100%, based on the sensed information according to the method steps discussed herein. Said performance curve, which may be applicable to one or more or all SCA's of a solar field, may advantageously be used for optimized control of the individual SCA or a whole solar field. Particularly, this allows improved thermal balancing of the solar field by precisely controlling working fluid exit temperature for each SCA (also referred to as loop in a solar field) for any sun position. Also, the risk of destroying the working fluid by application of excessive temperatures may be significantly lowered while, at the same time, achieving highest outputs of the solar field.

Figure 26A:
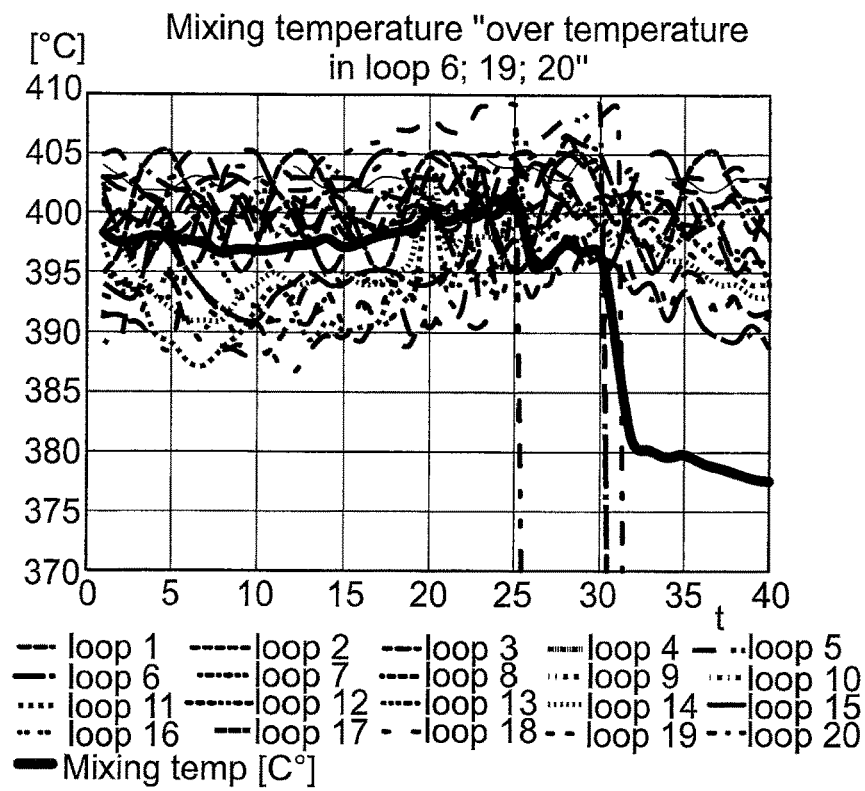
Figure 26B:
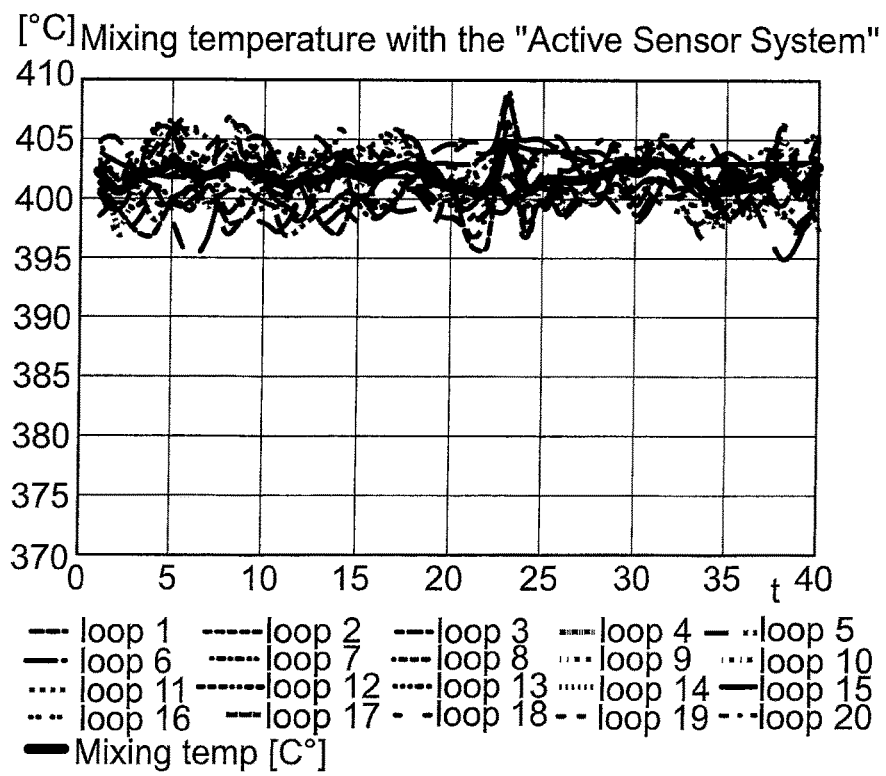

FIG. 26 shows a comparison of a solar field output of a field having 20 loops, i.e. 80 SCAs (one loop comprising four SCA's). The individual curves show the working fluid temperature exiting individual loops as well as the resulting temperature 'Mixing temp', i.e. the temperature of the working fluid finally leaving the solar field. FIG. 26a shows a regular, known control and adjustment of the individual loops, wherein three loops are shut down upon reach of a critical temperature of the working fluid flowing therethrough (here, e.g., approaching 410° C.; for example, thermal oil may deteriorate as from such temperature range). This is particularly due to the lack of ability to control an individual loop (or SCA) to provide a particular thermal fluid temperature. Thus, for safety reasons, those loops reaching a critical temperature will be brought into a safe position where the receiver tube is outside the focal line and the fluid flowing there through is no longer heated. As a result, the overall fluid temperature of the fluid exiting the solar field (see thick graph 'Mixing temp') significantly decreases. FIG. 26b, on the other hand, shows a control and adjustment according to the present invention (therein referred to as "Active Sensor System"), which allows a far more defined control of all individual loops and thus higher output of the solar field. It can readily be seen that no loops had to shut down. Rather, as can be taken from the peak Q at which the temperature of some loops obviously approached critical temperature, the individual loops (the SCA's forming the loops) were controlled to move just slightly, based on the information known from the above described referencing, to lower the fluid temperature to a value outside the critical range but sill close to/at the optimum desired temperature. Thus, no losses occurred due to shut down of individual loops. Also, it can be taken from said FIG. 26b that all loops are more defined controlled at the desired maximum efficiency, as can be taken from the more condensed overall curve and the resulting 'mixing temp' of just above 400° C. In other words, the structure and method according to the present invention allow both, a more defined and close control of an individual SCAs tracking as well as an improved control of an entire solar field with a plurality of SCA's.

According to the thermal adjustment, the temperature of a heating liquid heated by at least one and preferably just one SCA (particularly when considering a solar field with a plurality of SCA's) or, alternatively, one loop, is sensed. For the describing the position of an SCA, inclination angles may be used, which may correspond to those sensed by the inclination sensor. For example, an angle of 90° may refer to orientation of the SCA (particularly the parabolic trough opening) to the east. 270° may indicate the orientation to the west, whereas 180° may refer to an upright position which may reflect solar noon. Based on a given angular position range for collecting sun energy during the course of a day, including, e.g., 110° and 250°, the angular positions at, e.g., 110°, 145°, 180°, 215°, and 250° may be taken as reference positions. Here said positions may be approached stepwise, i.e. with angular steps. Said steps preferably lay in the range from preferably from 0.1° to 0.2°, while said step width may be adjusted also according to experience with the used components and conditions (larger steps may be chosen in case of a high degree of experience with the given setting while smaller steps may be chosen for less experience), while continuously measuring the fluid inlet and outlet temperature and calculating the temperature difference between fluid inlet and outlet temperature for each step/position. The time between two steps is preferably such as to allow the temperature change, particularly increase or decrease, of the working fluid from the receiver tube inlet to the receiver tube outlet to approach a stationary state. Based on the measured temperature differences, the optimum position, i.e. the position with the highest temperature difference, may be determined. Preferably, the camera senses shadow information and the inclinometer senses angular information at all respective angular positions and the respective information is stored, preferably at a central system to which the sensor sends the respective information via an interface. In addition, respective time information may be stored. Each respective shadow information may be considered to represent a respective power state so that, in subsequent control, it may be relied on the shadow information only for adjusting the power output level of the SCA. Thus, allocating reference thermal output information to shadow information may significantly improve processing of the shadow images and effective positioning of the SCA relative to the sun. Since the mechanical and structural behavior of the SCA's of a kind in a solar power field may be considered to substantially correspond to one another, the information obtained by thermal adjustment of one SCA may be transferred to other SCA's under corresponding conditions, e.g. SCA's of a kind in one solar field. Thermal adjustment may thus allow improved interpretation of camera information (based on a shadow picture and the position of the shadow on the shadow receiver, i.e. relative to the camera). Also, in use, this allows improved control, particularly as regards percentages of the maximum power level, of the SCA position(s).

Independently of the above discussed thermal adjustment, which may only be performed for one SCA among a field of multiple SCA'S, an SCA or each SCA of a field of SCA'S may be further adjusted, by sensing the temperature of a heating liquid heated by the (or all) SCA(s), wherein, for a given angular position of shadow entry on the shadow receiver, said angular position is approached with angular steps, said steps preferably laying in the range from 0.1° to 0.2°, while continuously measuring the fluid inlet and outlet temperature and calculating the temperature difference between fluid inlet and outlet temperature, as referred to above. The time between two steps is preferably such as to allow the temperature change from inlet to outlet to approach a stationary state, wherein, once said temperature difference exceeds 2K, the respective angular position and/or the respective camera picture, preferably along with the time, are stored and considered to represent the daily start position for the respective SCA's tracking. This allows easy and reliable determination of a reference starting position for each SCA. This procedure may be taken only once for setting up the SCA and its control. For, e.g., yearly, revision, however, said procedure may be run again. Season differences etc. may be considered by way of calculation but do not necessarily require readjustment.

In case an SCA comprises more than one sensor arrangement, the above discussed method steps are simultaneously performed for all sensor arrangements of one SCA.

The method(s) of the present invention allow to measure and/or calculate an offset (in degrees, millimeters or pixels) between an SCA's target position (e.g. according to the manufacturing master data) and its actual position relative to the sun. This offset may be stored in the controller and used for an optimized control of the tracking and positioning of the SCA(s). In addition or alternatively, the raw data resulting from the adjusting methods according to the present invention, including time data, inclination values and time, may be stored. This allows to take into account various factors which may result in deviations from the target position, including manufacturing, construction, environment etc.

Assuming that the tracking algorithm, which is generally independent of the actual SCA(s) used, is changed, e.g. via an update, the offset calculated based on the former, old algorithm may no longer be valid. However, a recalculation based on the stored raw data together with the updated algorithm may lead to an updated offset, without the need to re-do the adjustment procedure, which would otherwise be required.

In case of tracking a concentrated solar power field including two or more SCAs, as also addressed above, the SCAs preferably each comprise a sensor arrangement as discussed herein. The method for adjusting and/or controlling the solar field is preferably being a method according to the above discussions. In particular, the mechanical adjustment and/or the thermal determination of the entry position is preferably performed for more than one, preferably all SCAs. The thermal adjustment, however, is preferably performed for less than all, preferably one SCA.

For a solar field comprising a plurality of SCA's, a performance curve for one or more of the SCAs is determined and the concentrated solar power field is and for thermally balanced by individually controlling the exit temperature of the thermal fluid of the of each SCA. The performance curve may either be determined for one or more or all of the SCA's or be determined for one or more SCA's and then be equally used for the remaining SCA's.

In addition or alternative to the methods discussed above, thermal adjustment of the SCA system may involve orienting one or more SCA to a test inclination at which the sun has yet to arrive. Preferably the test inclination is at least 2°, 5°, 10° or 15°, to the west of the sun's inclination. More preferably the test inclination is at least 2° and at most 5° to the west of the sun's inclination. As the sun then transits through the test inclination the outlet temperature and the inlet temperature of the SCA are recorded creating a temperature change profile along with pictures of the full width shadow taken by the camera contained in the sensor arrangement. From the flow speed of the fluid within the receiver and the distance of the temperature sensor from the SCA, the resulting temperature difference profile can be time adjusted to correspond to the actual inclination of the sun and the corresponding shadow picture taken by the camera. Other data can be collected during this test, such as the time, the SCA position, the calculated tracking angle, the flow speed within the receiver, the inlet temperature, the outlet temperature, DNI (direct normal irradiation), optical offset of the ATS (active tracking system), pictures of the ATS as raw data and/or other data. Preferably the temperature change profile is provided over a time span of between 5 minutes and 30 minutes, more preferably between 10 minutes and 25 minutes, and even more preferably between 15 minutes and 25 minutes.

Figure 27A:
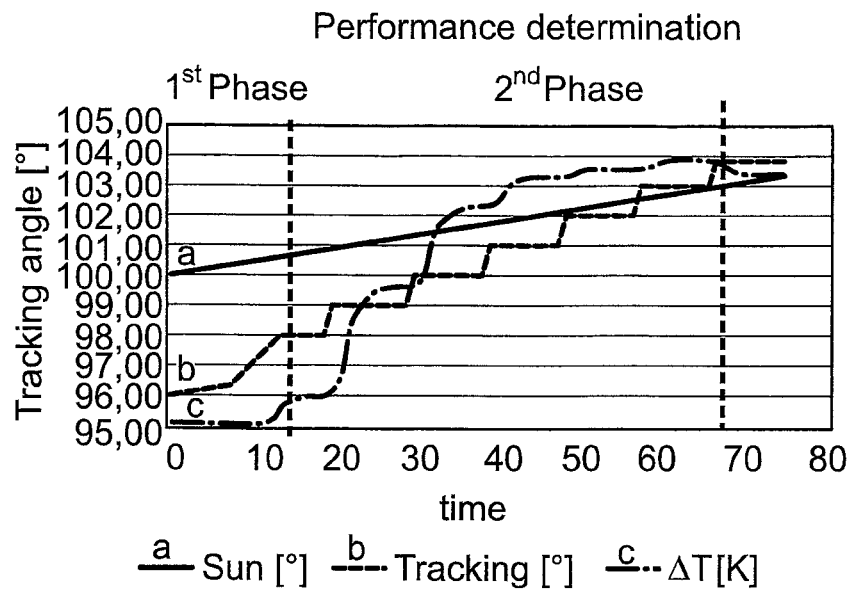
Figure 27B:
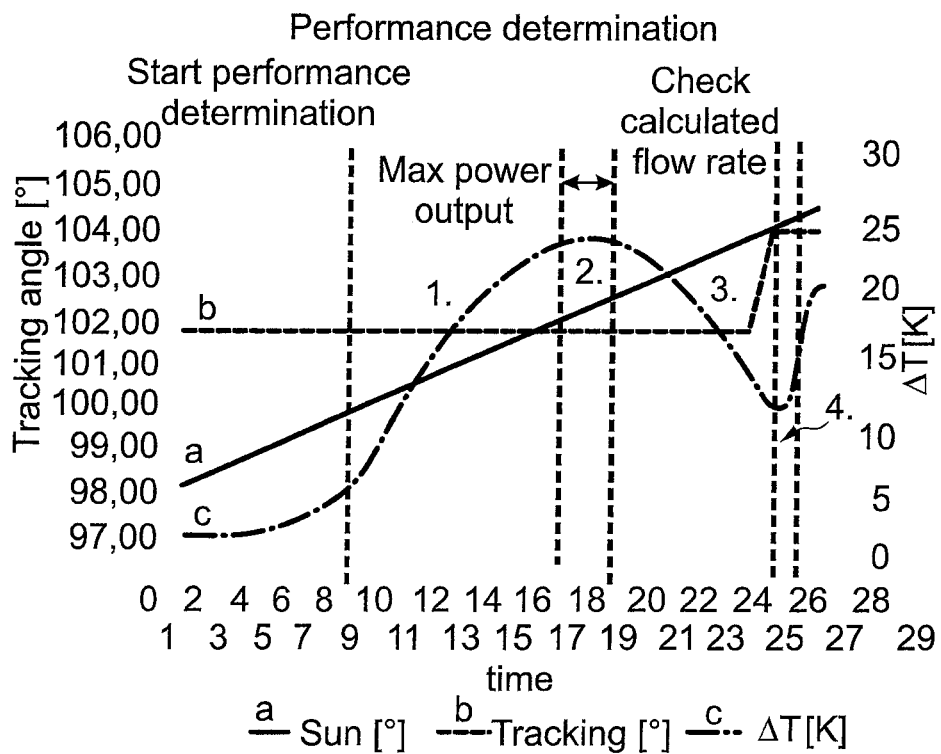
Figure 28:
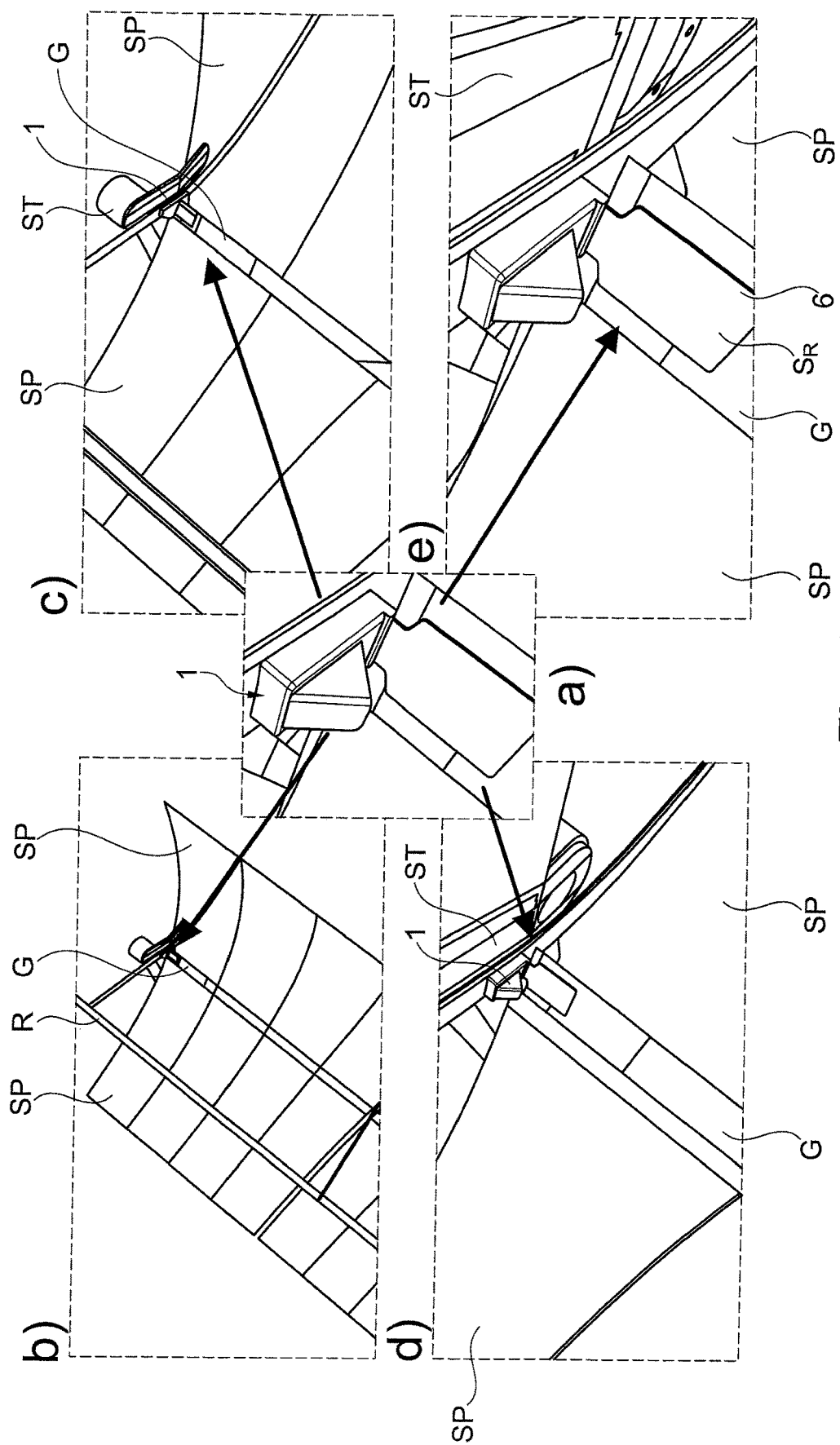
FIG. 28 shows a mounting situation.

FIGS. 27a and 27b show examples of the temperature difference profiles for an SCA using both of the thermal adjustment techniques. As shown in FIG. 27a, the step-wise approach for creating the temperature difference profile is demonstrated conceptually. Therein the SCA is oriented to a number of different inclination angles in a step-wise fashion as previous described and the output temperature (preferably minus the input temperature) is then provided and may be used to locate the maximum thermal output along with the associated data as referred to above (e.g. correlating shadow picture as taken by the camera etc.).

As shown in FIG. 27b, the single test inclination of thermal adjustment is demonstrated conceptually. The test inclination of the SCA is held constant while temperature data is collected during the sun transit. The temperature difference profile may be divided into phases. In the zero phase the inclination of the sun separated by too many degrees for a relevant increase in temperature to begin. In phase 1 the outlet temperature begins to climb. In phase 2 the maximum temperature, i.e. optimal inclination of the SCA relative to the sun's position is achieved which can thereby produce the greatest energy efficiency. In phase 3 the temperature begins to fall as the sun moves away from the inclination angle of the SCA. In optional phase 4 the SCA system can be adjusted to a new inclination to further testing or operation. The measured temperature may be allocated to a respective picture taking by the camera under consideration of the temperature medium's flow, taking parameters such as flow speed, receiver tube diameter, and/or receiver tube length etc. into consideration.

From the resulting temperature difference profile not only can the optimal inclination of the SCA system be improved, but also or alternatively valuable operating information about the SCA itself may be derived. For instance, the breadth of the maximum temperature peak in phase 2 can be measured to derive the individual inclination angle tolerance of each SCA. The form of the temperature peak also contains information in that a maximum temperature possessing a natural curve may be distinguished from that of a maximum temperature plateau. The degree of curvature of the peak region can be an indicator for the optical qualities of the SCA such as the mechanical function, the reflective quality and the condition of the receiver. A comparison of the temperature difference profile in phase 1 with that of phase 3, for instance, whether phase 1 and phase 2 present a symmetric temperature increase and decrease can also yield information on the quality of the SCA. The form of the phases may also help to identify misalignment and/or wearing of the SCA so as to indicate when maintenance may be needed. For example, inclination, turning points, phase distribution etc. of the curve may be determined and used for interpretation of the temperature profile.

It should be noted that the identification of temperature phases from the temperature difference profile may also be derived directly during data acquisition instead of subsequent thereto. For instance, when a certain slope or curvature of the temperature difference profile has been achieved, the transition from one phase to the next may be identified. Extracting a temperature difference profile for each SCA can be performed individually or simultaneously to derive an overall operational temperature difference profile.

The respective data retrieved may be used for an optimized control of the SCA during operation. In particular, tracking may be controlled by inclining the SCA such that the current shadow picture closely matches the shadow picture correlating to the highest temperature output during the thermal adjustment.

Preferable alternative and/or additional features of the present invention can be deduced from the following preferred aspects:

1. Sensor arrangement for tracking a concentrated solar power system, preferably a solar collector assembly the sensor arrangement comprising a housing; said housing comprising an inclination sensor and a camera; said sensor arrangement being suitable for receiving and/or cooperating with a shadow receiver; said shadow receiver being arranged and adapted to receive the, preferably full, shadow of a solar system's receiver tube, wherein the camera and the shadow receiver are arranged such that the camera may sense the, preferably full width of the, receiver tube's shadow on the shadow receiver.

2. Sensor arrangement according to the preceding aspect, wherein the sensor arrangement is adapted so as to allow mounting thereof in the area of the apex of a parabolic trough mirror and to receive the shadow of the receiver tube.

3. Sensor arrangement according to any one of the preceding aspects, wherein the sensor arrangement is adapted so as to allow mounting thereof in the area of the apex of a parabolic trough mirror outside the parabolic trough, preferably to the support structure, or within the parabolic trough mirror, preferably to a support structure supporting the receiver tube.

4. Sensor arrangement according to any one of the preceding aspects, wherein the sensor arrangement comprises at least one, preferably two, preferably substantially parallel, side shield(s), wherein the side shield, preferably, extends along at least the whole length and/or height of the housing, and/or wherein, preferably, the side shield is(are) spaced from the housing. 5. Sensor arrangement according to any one of the preceding aspects, wherein the side shield is spaced from the housing via at least one spacer, wherein, preferably, the spacers is made of or comprises a heat resisting material with low thermal conductivity, e.g., PTFE, and/or wherein, preferably, the side shield is made of metal or alumina.

6. Sensor arrangement according to any one of the preceding aspects, wherein the side shield comprises at least three, preferably five, and preferably seven slits.

7. Sensor arrangement according to any one of the preceding aspects, wherein the housing is substantially cuboid or box shaped, and wherein the camera and the inclination sensor are arranged within said housing and wherein the shadow receiver is attached to (and/or only partly contained in but extends from,) and extends from said housing.

8. Sensor arrangement according to any one of the preceding aspects, wherein the shadow receiver is a planar, flat, member, preferably having a matt surface finish.

9. Sensor arrangement according to any one of the preceding aspects, wherein the camera is positioned at an angel to the shadow receiver, said angle preferably being less than 90°, and preferably about 45°.

10. Sensor arrangement according to any one of the preceding aspects, wherein the distance between the camera and the shadow receiver is such that the camera, at least at one point in time on one day senses the full shadow width of the receiver tube's shadow on the shadow receiver.

11. Sensor arrangement according to any one of the preceding aspects, wherein the sensor housing comprises two interfaces, preferably two BUS-Interfaces.

12. Sensor arrangement according to any one of the preceding aspects, wherein the sensor housing comprises a thermal exchanger for cooling and/or heating the camera and/or the inclination sensor and/or associated electronic components.

13. Sensor arrangement according to any one of the preceding aspects, wherein the sensor housing comprises a thermal exchanger for cooling and/or heating the camera and/or the inclination sensor and/or associated electronic components.

14. Sensor arrangement according to any one of the preceding aspects, wherein the sensor housing comprises heating cartridge.

15. Sensor arrangement according to any one of the preceding aspects, wherein the sensor housing comprises a copper plate, preferably for conducting heat and/or cold to and/or from the camera and/or the inclination sensor and/or associated electronic components.

16. Sensor arrangement according to any one of the preceding aspects, wherein the sensor housing comprises structures to dissipate heat away from the camera and/or the inclination sensor and/or associated electronic components.

17. Sensor arrangement according to any one of the preceding aspects, wherein the housing comprises a main carrier onto which the camera and the inclination sensor are mounted.

18. Sensor arrangement according to aspect 17, wherein the main carrier also provides a connector/mount for connecting the shadow receiver and/or for mounting the housing to the solar power system.

18a. Sensor arrangement according to any one of aspects 17 or 18, wherein the main carrier 12 is adapted to achieve a stable relative and/or predefined positioning of the components connected thereto, preferably of the camera with regard to the inclination sensor, and further preferably, in addition thereto, of the shadow receiver and/or with regard to the SCA to which it is mounted.

18b. Sensor arrangement according to any one of the preceding aspects, wherein the sensor arrangement is an individual unit.

19. Method for adjusting concentrated solar power system, preferably a solar collector assembly (SCA), for tracking the sun, the system/assembly preferably comprising a sensor arrangement according to any one of the preceding aspects, the method comprising the steps of mechanically adjusting the sensor arrangement with the CSP system; and thermally adjusting the sensor arrangement with the CSP system.

20. Method for adjusting concentrated solar power system, according to any one of the preceding method aspects, including adjusting the mounting position of the sensor arrangement on a CSP system, in particular, the mounting position of the sensor system on a solar collector assembly (SCA).

21. Method for adjusting concentrated solar power system, according to any one of the preceding method aspects, wherein the thermal adjustment of the sensor arrangement together with the CSP system involves determining an optimal position(s) of the solar collector assembly (SCA) with regard to the sun based on the thermal output of the heating fluid and aligning it with respective sensor data such as inclinometer data, camera, and/or time data.

22. Method for adjusting concentrated solar power system, according to aspect 21, wherein such thermal adjustment is made once, preferably for one SCA out of a number of SCAs or a solar field, to provide control information allowing improved tracking for a multitude of tracking cycles for more than one, preferably all, SCAs of the solar field.

23. Method for adjusting concentrated solar power system, according to any one of the preceding method aspects, comprising the steps of mounting the sensor arrangement to a solar power system, preferably a solar collector assembly (SCA), preferably in the vicinity of the apex of the parabolic trough mirror, so as to be able to receive the full width of the shadow of the receiver tube, more preferably, mounting the sensor arrangement outside a parabolic trough, preferably to the support structure, or within the parabolic trough, preferably to a support structure supporting the receiver tube; adjusting the SCA such that the receiver tube's shadow is received, in its full width, by the sensor's shadow receiver; measuring an inclination value using an inclination sensor contained in the sensor arrangement, as well as taking and storing the time along with a picture of the full width shadow with the camera contained in the sensor arrangement; said method preferably including communicating the data and information to a controller and storing of the data and information by the controller.

24. Method for adjusting concentrated solar power system, according to any one of the preceding method aspects, comprising the steps of adjusting the SCA such that the entire shadow of the receiver tube moves along the shadow receiver, such as from one maximum inclination to a second maximum inclination or from shadow entry to shadow exit, while, preferably, sensing the shadow received by the sensor's shadow receiver and sensing angular position data as well as storing data obtained by the camera and the inclination sensor as well as associated time data, preferably by communicating to and storing these data obtained by the camera and the inclination sensor along with associated time data on a local or central controller.

25. Method for adjusting concentrated solar power system, according to any one of the preceding method aspects, comprising the step of storing information including first sensing of the first shadow portion received on the shadow receiver (shadow entry), sensing of the shadow centre (when the full shadow is received on the shadow receiver), and sensing of the last shadow portion received on the shadow receiver (exit) along with the associated angular position sensed by the inclinometer, the picture of the shadow as taken by the camera, and the associated time, well as, preferably, communicating to and storing these data obtained by the camera and the inclination sensor along with associated time data on a local or central controller.

26. Method for adjusting concentrated solar power system, according to any one of the preceding method aspects, wherein the method steps are performed at least twice, once from east to west and once from west to east, i.e. in opposite directions.

27. Method for adjusting concentrated solar power system, according to any one of the preceding method aspects, wherein the mounting to the SCA is effected with a tolerance of +/−2°, preferably +/−1.5° and more preferably +/−1° of the reference orientation position, and/or wherein the mounting of the sensor arrangement to the SCA may be effected with a tolerance of in translatory displacement perpendicular to the tracking axis of about +/−3-5 mm, preferably about +/−2-3 mm of the sensor's desired or reference position 25.

28. Method for adjusting concentrated solar power system, according to any one of the preceding method aspects, wherein the mounting to the SCA comprises mounting of three sensor arrangements to the SCA, preferably one sensor arrangement at each end of the SCA and one sensor arrangement in the middle of the SCA, as seen along the longitudinal axis of the parabolic trough.

29. Method for adjusting concentrated solar power system, according to any one of the preceding method aspects, wherein, if the SCA comprises two, three or more sensor arrangements mounted thereto, the respective method steps apply to two, there, more or all sensors.

30. Method for adjusting concentrated solar power system, preferably an SCA, according to any one of the preceding method aspects, wherein the temperature of a heating liquid heated by the system, preferably the SCA, is sensed, and wherein, based on a given angular position range for collecting sun energy during the course of a day including 110° and 250°, for example 110° reflecting morning and 205° reflecting evening, during a day's operation of the solar power system, the angular positions at 110°, 145°, 180°, 215°, and 250° are approached with angular steps, said steps preferably laying in the range from 0.01° to 1°, more preferably from 0.05° to 0.5° and more preferably from 0.1° to 0.2°, while continuously measuring the fluid inlet and outlet temperature and calculating the temperature difference between fluid inlet and outlet temperature, wherein the time between two steps is preferably such as to allow the temperature increase from inlet to outlet to approach a stationary state, and based on the measured temperature differences determining the optimum position, i.e. the position with the highest temperature difference, the camera sensing shadow information and the inclinometer sensing angular information at the respective angular positions and storing the respective information; preferably wherein the respective shadow information is considered to represent a respective power state, for example based on the sensed temperature and inclination information, preferably along with sun position and time information and that, in subsequent control, it will be relied on the shadow information for adjusting the power output level of the SCA.

31. Method for adjusting concentrated solar power system, according to any one of the preceding method aspects, wherein the temperature of a heating liquid heated by the or all systems SCA is sensed, and wherein, for a given angular position of shadow entry on the shadow receiver, said angular position is approached with angular steps, said steps preferably laying in the range from 0.01° to 1°, more preferably from 0.05° to 0.5° and more preferably from 0.1° to 0.2°, while continuously measuring the fluid inlet and outlet temperature and calculating the temperature difference between fluid inlet and outlet temperature, wherein the time between two steps is preferably such as to allow the temperature change from inlet to outlet to approach a stationary state, wherein, once said temperature difference exceeds 1K, preferably 2K, 4K or 6K, the respective angular position and/or the respective camera picture are stored, preferably along with respective time and/or sun position data, and considered to represent the daily start position for the SCA's tracking.

32. Method for adjusting a solar collector assembly (SCA), for tracking the sun, the assembly comprising a sensor arrangement preferably according to any one of the preceding aspects, the method comprising the steps of thermally adjusting the sensor arrangement with the CSP system, wherein thermally adjusting the sensor arrangement includes continuously recording the position of the shadow on the shadow receiver for a test angular position of the SCA, wherein the fluid inlet temperature and the fluid outlet temperature are measured continuously and the temperature difference between the fluid inlet temperature and the fluid outlet temperature is calculated and provided as a temperature difference profile, wherein the respective test angular position and/or the respective shadow camera pictures are stored.

33. Method for adjusting an SCA, according to any one of the preceding method aspects, wherein, for a test angular position of the SCA the position of the shadow on the shadow receiver is continuously recorded, wherein the fluid inlet temperature and the fluid outlet temperature are measured continuously and the temperature difference between the fluid inlet temperature and the fluid outlet temperature is calculated and provided as a temperature difference profile, wherein the respective test angular position and/or the respective shadow camera pictures are stored.

34. Method for adjusting an SCA, according to aspect 32 or aspect 33, wherein the shadow entry camera pictures are correlated to the temperature difference profile such that a peak of the temperature difference profile may be associated with one or more of the shadow entry camera pictures.

35. Method for adjusting an SCA, according to any one of aspects 32-34, wherein the test angular position of the SCA is at least 2° west of a measured position of the sun, preferably wherein the test angular position of the SCA is at least 5° west of a measured position of the sun, more preferably wherein the test angular position of the SCA is at least 10° west of a measured position of the sun.

36. Method for adjusting an SCA, according to any one of aspects 32-35, wherein the temperature difference profile is recorded over a time span of between 5 minutes and 30 minutes, preferably between 10 minutes and 25 minutes, and more preferably between 15 minutes and 25 minutes.

37. Method for adjusting an SCA, according to any one of claims 32-36, wherein the temperature difference profile is used to evaluate an optical quality of the SCA, preferably wherein the shape of a peak of the temperature difference profile is correlated to the optical quality of the SCA.

38. Method for adjusting concentrated solar power system, according to any one of the preceding method aspects, wherein the method steps are simultaneously performed for all sensor arrangements of one system/SCA.

39. Method for adjusting concentrated solar power system, according to any one of the preceding method aspects, wherein a performance curve is determined based on the sensed information.

40. Method for tracking a concentrated solar power field including two or more SCAs, the SCAs preferably each comprising a sensor arrangement according to any of the preceding sensor assembly aspects, the method preferably being a method according to any one of the preceding method aspects, wherein the method steps according to any of aspect 19 to 29 and 31 to 33 are performed for more than one, preferably all systems/SCAs and wherein the method steps according to aspect 30 are performed for less than all, preferably just one system/SCA.

41. Method according to any one of aspects 31 to 37, comprising the steps of determining a performance curve for any one of the SCAs and for thermally balancing the concentrated solar power field by individually controlling the exit temperature of the thermal fluid of the of each SCA.

42. Method for adjusting an SCA according to any of the preceding method aspects, wherein an offset, preferably [in degrees, millimeters or pixels, is measured and/or calculated between an SCA's target position and its actual position relative to the sun.

43. Method according to aspect 42, wherein this offset is stored in a controller and used for an optimized control of the tracking and positioning of the SCA when controlling the SCA's position.

44. Method for adjusting an SCA according to any of the preceding method aspects, wherein the raw data resulting from the adjusting method steps, including time data, inclination values and time, are stored.

45. A solar collector assembly, comprising a solar collector element forming a parabolic trough, supported by a support structure, a receiver tube as well as a sensor arrangement according to any one of the above sensor arrangement aspects.

46. Solar field comprising a plurality of solar collector assemblies according to aspect 45.

47. Method according to any one of the above method aspects, the method being applied to the solar collector assembly according to aspect 45 and/or the one or more solar collector assemblies according of the solar field according to aspect 46.

The system and method according to the present invention have proven to be advantageous, in particular in comparison with the solutions known from the prior art.

As far as the preceding description uses the term "essentially", embodiments realizing the respective feature in full or completely are also covered. The terms "a plurality of" or "several" are to be understood within the meaning of "at least two", i.e., two or more. As far as concrete values are indicated, slight deviations of these values are preferably covered as well, such as, for example deviations of ±10% or ±5% of the respective value. Individual aspects of the invention can form independent inventions and also be claimed as such.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sensor arrangement for tracking a solar collector assembly, the sensor arrangement comprising
    a housing comprising an inclination sensor and a camera;
    a shadow receiver arranged and adapted to receive a full shadow of a solar system receiver tube,
    wherein the camera and the shadow receiver are arranged such that the camera is adapted to sense a full width of a shadow of the solar system receiver tube on the shadow receiver,
    wherein the shadow receiver is attached to and extends from the housing or the shadow receiver is only partly contained in but extends from the housing, and
    wherein the camera is positioned at an angle to the shadow receiver, the angle being less than 90° or about 45°.

2. The sensor arrangement according claim 1, wherein the sensor arrangement is adapted so as to allow mounting thereof in an area of an apex of a parabolic trough mirror and to receive the shadow of the solar system receiver tube.

3. The sensor arrangement according claim 1, wherein the sensor arrangement is adapted so as to allow mounting thereof in the area of the apex of a parabolic trough mirror outside the parabolic trough to its support structure, or within the parabolic trough mirror to a support structure supporting the receiver tube.

4. The sensor arrangement according claim 1, wherein the sensor arrangement comprises at least one or two side shields, wherein the side shield extends along at least the whole length and/or height of the housing, and wherein the side shield is spaced from the housing.

5. A sensor arrangement for tracking a solar collector assembly, the sensor arrangement comprising
    a housing comprising an inclination sensor and a camera;
    a shadow receiver arranged and adapted to receive a full shadow of a solar system receiver tube,
    wherein the camera and the shadow receiver are arranged such that the camera is adapted to sense a full width of a shadow of the solar system receiver tube on the shadow receiver,
    wherein the shadow receiver is attached to and extends from the housing or the shadow receiver is only partly contained in but extends from the housing,
    wherein the sensor arrangement comprises at least one or two side shields, wherein the side shield extends along at least the whole length and/or height of the housing, and wherein the side shield is spaced from the housing, and
    wherein the side shield is spaced from the housing by at least one spacer, and wherein, the spacer is made of or comprises a heat resisting material with low thermal conductivity.

6. A sensor arrangement for tracking a solar collector assembly, the sensor arrangement comprising
    a housing comprising an inclination sensor and a camera;
    a shadow receiver arranged and adapted to receive a full shadow of a solar system receiver tube,
    wherein the camera and the shadow receiver are arranged such that the camera is adapted to sense a full width of a shadow of the solar system receiver tube on the shadow receiver,
    wherein the shadow receiver is attached to and extends from the housing or the shadow receiver is only partly contained in but extends from the housing, and wherein the side shield comprises at least three, five, or seven slits.

7. A sensor arrangement for tracking a solar collector assembly, the sensor arrangement comprising
    a housing comprising an inclination sensor and a camera;
    a shadow receiver arranged and adapted to receive a full shadow of a solar system receiver tube,
    wherein the camera and the shadow receiver are arranged such that the camera is adapted to sense a full width of a shadow of the solar system receiver tube on the shadow receiver,
    wherein the shadow receiver is attached to and extends from the housing or the shadow receiver is only partly contained in but extends from the housing, and
    wherein the sensor housing comprises a thermal exchanger to cool and/or heat the camera and/or the inclination sensor and/or associated electronic components.

8. A sensor arrangement for tracking a solar collector assembly, the sensor arrangement comprising
    a housing comprising an inclination sensor and a camera;
    a shadow receiver arranged and adapted to receive a full shadow of a solar system receiver tube, wherein the camera and the shadow receiver are arranged such that the camera is adapted to sense a full width of a shadow of the solar system receiver tube on the shadow receiver, wherein the shadow receiver is attached to and extends from the housing or the shadow receiver is only partly contained in but extends from the housing, and wherein the sensor housing comprises a copper plate to conduct heat to the camera and/or the inclination sensor and/or associated electronic components, and wherein the sensor housing comprises structures to dissipate heat away from the camera and/or the inclination sensor and/or associated electronic components.

9. A sensor arrangement for tracking a solar collector assembly, the sensor arrangement comprising
a housing comprising an inclination sensor and a camera;
a shadow receiver arranged and adapted to receive a full shadow of a solar system receiver tube,
wherein the camera and the shadow receiver are arranged such that the camera is adapted to sense a full width of a shadow of the solar system receiver tube on the shadow receiver,
wherein the shadow receiver is attached to and extends from the housing or the shadow receiver is only partly contained in but extends from the housing, and
wherein the housing comprises a main carrier onto which the camera and the inclination sensor are mounted.

10. A method for adjusting a solar collector assembly (SCA) of a concentrated solar power (CSP) system for tracking the sun, the assembly comprising a sensor arrangement according to claim 1, the method comprising:
mechanically adjusting the sensor arrangement with the CSP system; and
thermally adjusting the sensor arrangement with the CSP system,
wherein the mechanical adjustment comprises:
the steps of mounting the sensor arrangement to the SCA;
adjusting the SCA such that the receiver tube's shadow is received, in its full width, by the sensor's shadow receiver;
measuring an inclination value using the inclination sensor contained in the sensor arrangement; and
taking and storing the time along with a picture of the full width shadow with the camera contained in the sensor arrangement;
wherein the thermal adjustment comprises:
determining an optimal position of the SCA based on the thermal output of a heating fluid of the CSP system; and
aligning the SCA based on respective sensor data including inclinometer data, camera data, and/or time data.

11. The method for adjusting an SCA according to claim 10, wherein the sensor is mounted to the solar collector assembly (SCA) in the vicinity of the apex of the parabolic trough mirror, so as to be able to receive the full width of the shadow of the receiver tube, or outside a parabolic trough to the support structure, or within the parabolic trough to a support structure supporting the receiver tube.

12. The method for adjusting an SCA according to claim 10, further comprising:
adjusting the SCA such that the shadow of the receiver tube moves along the shadow receiver while sensing the shadow received by the sensor's shadow receiver and sensing angular position data as well as storing data obtained by the camera and the inclination sensor as well as associated time data;
storing information including first sensing of the first shadow portion received on the shadow receiver, sensing of the shadow centre, and sensing of the last shadow portion received on the shadow receiver along with the associated angular position sensed by the inclinometer, the picture of the shadow as taken by the camera, and the associated time.

13. The method for adjusting an SCA according to claim 10, wherein the temperature of a heating liquid heated by the SCA, is sensed, and wherein, based on a given angular position range for collecting sun energy during the course of a day including 110° and 250°, the angular positions at 110°, 145°, 180°, 215°, and 250° are approached with angular steps, said steps preferably laying in the range from 0,01° to 1°, from 0,05° to 0,5° or from 0,1° to 0,2°, while continuously measuring the fluid inlet and outlet temperature and calculating the temperature difference between fluid inlet and outlet temperature, wherein the time between two steps is such as to allow the temperature increase from inlet to outlet to approach a stationary state, and based on the measured temperature differences determining the optimum position, the camera sensing shadow information and the inclinometer sensing angular information at the respective angular positions and storing the respective information.

14. The method for adjusting an SCA according to claim 10, wherein the temperature of the heating liquid heated by the SCA is sensed, and wherein, for a given angular position of shadow entry on the shadow receiver, said angular position is approached with angular steps, said steps laying in the range from 0,01° to 1°, from 0,05° to 0,5° and or from 0,1° to 0,2°, while continuously measuring the fluid inlet and outlet temperature and calculating the temperature difference between fluid inlet and outlet temperature, wherein the time between two steps is preferably such as to allow the temperature change from inlet to outlet to approach a stationary state, wherein, once said temperature difference exceeds 1K, 2K, 4K or 6K, the respective angular position and/or the respective camera picture are stored, preferably along with respective time and/or sun position data, are considered to represent the daily start position for the SCA's tracking.

15. A method for adjusting a solar collector assembly (SCA), for tracking the sun, the assembly comprising a sensor arrangement, the sensor arrangement comprising a housing comprising an inclination sensor and a camera; a shadow receiver arranged and adapted to receive a full shadow of a solar system receiver tube, wherein the camera and the shadow receiver are arranged such that the camera is adapted to sense a full width of a shadow of the solar system receiver tube on the shadow receiver, and wherein the shadow receiver is attached to and extends from the housing or the shadow receiver is only partly contained in but extends from the housing, the method comprising:
thermally adjusting the sensor arrangement with the CSP system, wherein thermally adjusting the sensor arrangement includes continuously recording the position of the shadow entry on the shadow receiver for a test angular position of the SCA;
continuously measuring the fluid inlet temperature and the fluid outlet temperature;
calculating a temperature difference between the fluid inlet temperature and the fluid outlet temperature;
providing a temperature difference profile based on the temperature difference; and storing the respective test angular position and/or the respective shadow entry camera pictures.

16. The method for adjusting an SCA, according to claim 15, wherein, for a test angular position of the SCA the position of the shadow entry on the shadow receiver is continuously recorded, wherein the fluid inlet temperature and the fluid outlet temperature are measured continuously and the temperature difference between the fluid inlet temperature and the fluid outlet temperature is calculated and provided as a temperature difference profile, wherein the respective test angular position and/or the respective shadow entry camera pictures are stored.

17. The method for adjusting an SCA, according to claim 15, wherein the shadow entry camera pictures are correlated to the temperature difference profile such that a peak of the temperature difference profile is associated with one or more of the shadow entry camera pictures.

18. The method for adjusting an SCA, according to claim 15, wherein the test angular position of the SCA is at least 2° west of a measured position of the sun, or wherein the test angular position of the SCA is at least 5° west of a measured position of the sun, or wherein the test angular position of the SCA is at least 10° west of a measured position of the sun.

19. The method for adjusting an SCA, according to claim 15, wherein the temperature difference profile is recorded over a time span of between 5 minutes and 30 minutes, between 10 minutes and 25 minutes, or between 15 minutes and 25 minutes.

20. The method for adjusting an SCA, according to claim 15, wherein the temperature difference profile is used to evaluate an optical quality of the SCA, and wherein the shape of a peak of the temperature difference profile is correlated to the optical quality of the SCA.

21. The method for adjusting an SCA, according to claim 15, wherein a performance curve is determined based on the sensed information.

22. A solar collector assembly comprising a solar collector element forming a parabolic trough, supported by a support structure, a receiver tube as well as a sensor arrangement according to claim 1.

* * * * *